(12) United States Patent
Kawabuchi et al.

(10) Patent No.: US 8,477,344 B2
(45) Date of Patent: Jul. 2, 2013

(54) NETWORK SYSTEM, METHOD, AND COMPUTER READABLE MEDIUM FOR IMAGE PROCESSING APPARATUS WITH TRANSMISSION AND STORAGE CAPABILITY OF GENERATED DATA TO SPECIFIC STORAGE LOCATION IN DATA SERVER

(75) Inventors: Yoichi Kawabuchi, Itami (JP); Ayumi Itoh, Ikomo-gun (JP); Hisashi Uchida, Kuze-gun (JP); Hidetaka Iwai, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1132 days.

(21) Appl. No.: 12/362,242

(22) Filed: Jan. 29, 2009

(65) Prior Publication Data

US 2009/0296133 A1 Dec. 3, 2009

(30) Foreign Application Priority Data

Jun. 2, 2008 (JP) .................................. 2008-144619

(51) Int. Cl.
*G06F 15/00* (2006.01)

(52) U.S. Cl.
USPC .......................... 358/1.15; 358/1.16; 358/474

(58) Field of Classification Search
USPC ......................................................... 358/1.15
See application file for complete search history.

(56) References Cited

U.S. PATENT DOCUMENTS

2008/0075077 A1* 3/2008 Roy et al. ...................... 370/390

FOREIGN PATENT DOCUMENTS

| JP | 10-222414 | 8/1998 |
|----|-----------|--------|
| JP | 2004-086731 | 3/2004 |
| JP | 2006-165712 | 6/2006 |

OTHER PUBLICATIONS

Machine translation for JP 2006-165712, IDS.*
Machine translation for JP 10-222414, IDS.*
Japanese Decision to Grant Patent mailed May 25, 2010, directed to Japanese Application No. 2008-144619; 6 pages.

* cited by examiner

*Primary Examiner* — Qian Yang
(74) *Attorney, Agent, or Firm* — Morrison & Foerster LLP

(57) ABSTRACT

An image processing apparatus includes a display, an obtaining unit obtaining second data containing information for identifying the link information having no image data in a corresponding storage position among the plural pieces of link information contained in the first data, a display control unit making the display selectively display first link information having image data in a corresponding storage position and second link information having no image data in the corresponding storage position in different formats based on the second data, and a transmission unit transmitting image data generated by a scanning unit to the corresponding storage position.

18 Claims, 25 Drawing Sheets

HTML SOURCE (original)

PANEL DISPLAY EXAMPLE (WEB DISPLAY)

```
<html>
  .
  .
<OMITTED>
  .
  .
<body>

<p><HOME PAGE OF XXX DEPARTMENT></p>

<p><SPECIFICATION LIST></p>                                    2101-2

<p><a href="file:doc_list/AAA_doc.pdf"><strike>AAA SPECIFICATION</strike></a></p>

<p><a href="file:doc_list/BBB_doc.pdf">BBB SPECIFICATION</a></p>    2103-2

<p><a href="file:doc_list/CCC_doc.pdf"><strike>CCC SPECIFICATION</strike></a></p>

</body>
</html>
```

HTML SOURCE (AFTER PRESSING OF "Scan to URL" KEY)

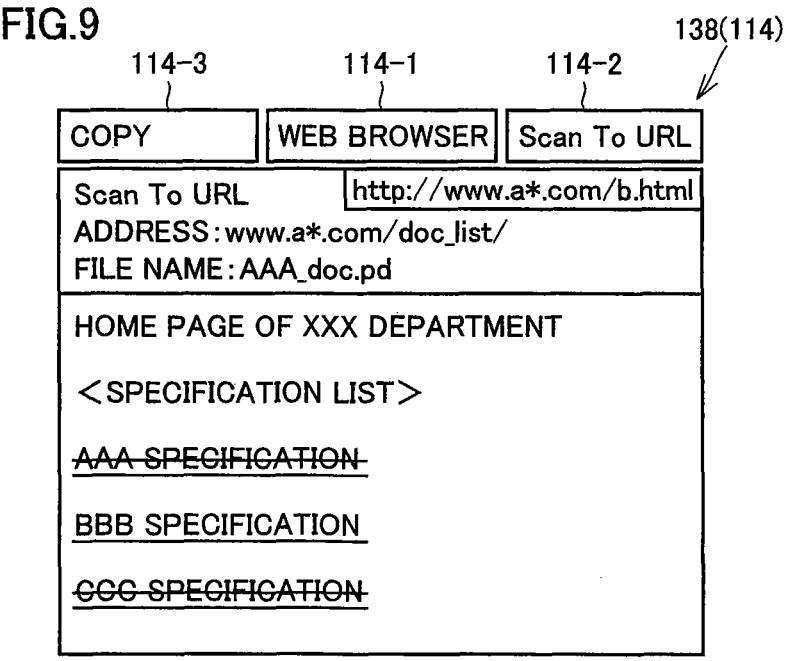

FIG.9

PANEL DISPLAY EXAMPLE
(AFTER PRESSING OF "Scan to URL" KEY)

FIG.10

| URL | FILE NAME OF LINK | KEY PRESSING RANGE | LINK STATUS |
|---|---|---|---|
| a*.com/doc_list | AAA_doc.pdf | 8,32,88,48 | NG |
| a*.com/doc_list | BBB_doc.pdf | 8,64,88,80 | OK |
| a*.com/doc_list | CCC_doc.pdf | 8,96,88,112 | NG |

LINK STATUS LIST 104-1

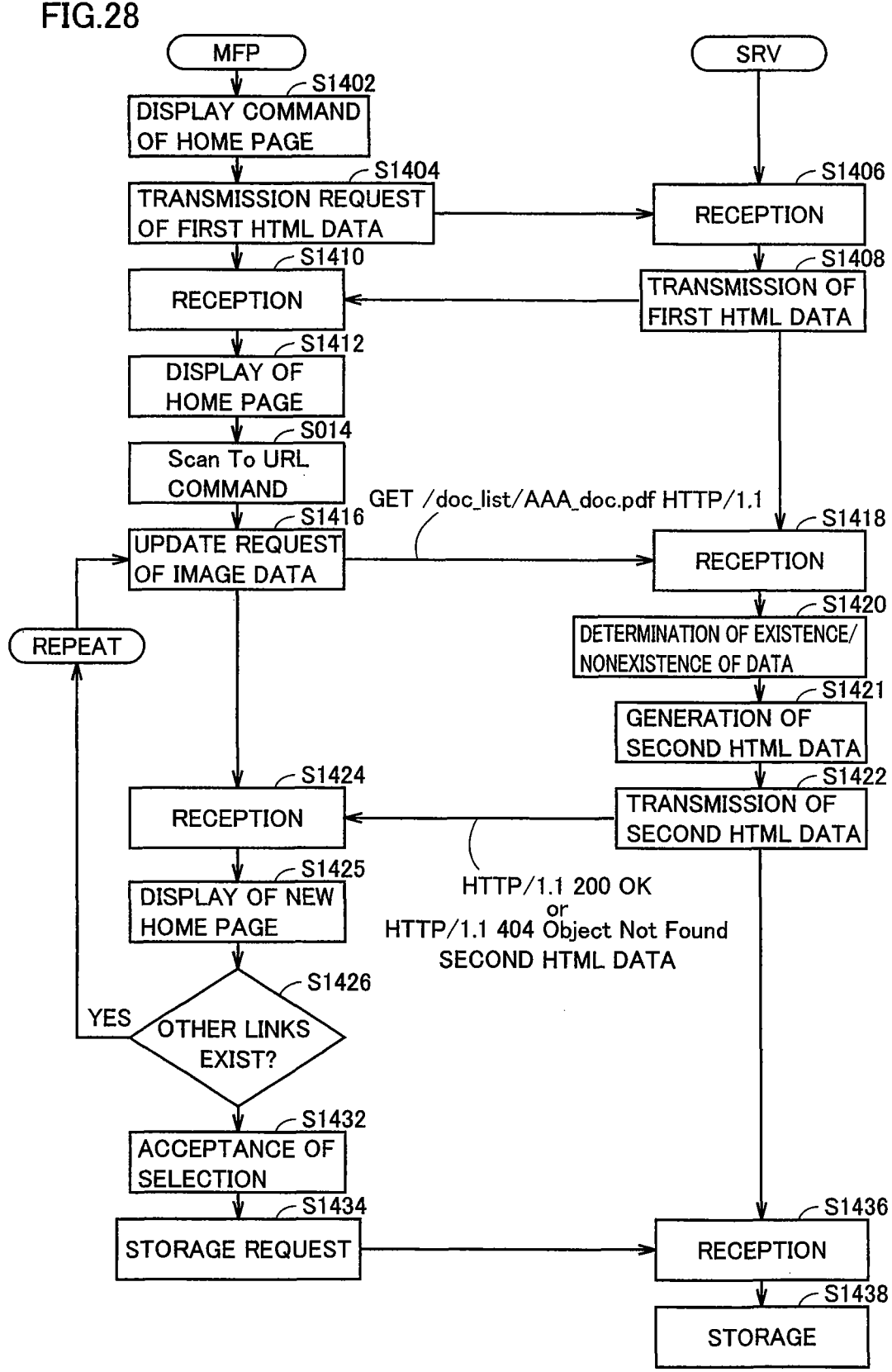

NETWORK SYSTEM, METHOD, AND COMPUTER READABLE MEDIUM FOR IMAGE PROCESSING APPARATUS WITH TRANSMISSION AND STORAGE CAPABILITY OF GENERATED DATA TO SPECIFIC STORAGE LOCATION IN DATA SERVER

This application is based on Japanese Patent Application No. 2008-144619 filed with the Japan Patent Office on Jun. 2, 2008, the entire content of which is hereby incorporated by reference.

BACKGROUND OF THE INVENTION

1. Field of the Invention

The present invention relates to a network system including a server and an image processing apparatus which are connected to each other through a network, the image processing apparatus of the network system, an image data storing method in the network system, and a computer readable medium recording an image data transmitting program. More particularly, the present invention relates to a network system in which image data read by an image processing apparatus is stored at a predetermined storage position in a server through a network, the image processing apparatus of the network system, an image data storing method in the network system, and a computer readable medium recording an image data transmitting program.

2. Description of the Related Art

There has been known an image processing apparatus that scans an image on a paper medium to generate image data and transmits (stores) the image data to (in) an external server or the like through a network. Moreover, such an image processing apparatus receives HTML (HyperText Markup Language) data from the server through use of a web browser, and makes a display unit to display a home page or the like based on the HTML data.

In order to create a home page in which image data read by the image processing apparatus is designated as a link, there has been known the following method, for example. That is, a folder serving as a link is prepared at a predetermined place in advance by a personal computer or the like, HTML data is generated, and image data is transmitted to the folder by the image processing apparatus. Alternatively, HTML data is generated in advance, and image data is transmitted temporarily to a predetermined place by the image processing apparatus. Thereafter, the image data is moved to a link to the HTML data.

As a technique of transmitting image data to an external server or the like, Japanese Laid-Open Patent Publication No. 2004-086731 discloses a scan mail transmitting system. In Japanese Laid-Open Patent Publication No. 2004-086731, the scan mail transmitting system makes a scanner to generate image data of an original and automatically generates a password. Thereafter, the scan mail transmitting system performs a process of uploading a file of the image data to a server (a web server for uploading) such that only a user who has the password can download the file through use of a web browser, and a process of transmitting a scan mail having a text containing a URL (Uniform Resource Locator) concerning the uploaded file and the password to a designated address.

In a home page provided with a link to a specification or a prepared material, occasionally, HTML data is generated for specifying a document structure in advance. Then, the specification or the prepared material on the link is updated newly without change of the HTML data. In such a home page, a storage position (address), a file name and the like of image data obtained by scanning must be equated to those set by the HTML data in advance. Consequently, the image data is stored at much expense in time and effort. In other word, it is troublesome for a user to transmit (store) image data read by an image processing apparatus to (at) a storage position of a link.

SUMMARY OF THE INVENTION

The present invention has been made to solve the problem described above, and an object thereof is to provide a network system that allows a user of an image processing apparatus to readily store image data read by the image processing apparatus at a predetermined storage position (link), the image processing apparatus, an image data storing method, and a computer readable medium recording an image data transmitting program.

In order to achieve this object, according to one aspect of the present invention, there is provided a network system including an image processing apparatus and at least one server configured to exchange data with the image processing apparatus over a network. Herein, the at least one server stores first data containing plural pieces of link information, each link information correlates a file name of image data to a storage position of the image data. The image processing apparatus includes a display, an obtaining unit obtaining second data containing information for identifying the link information having no image data in a corresponding storage position among the plural pieces of link information contained in the first data, a display control unit making the display selectively display first link information having image data in a corresponding storage position and second link information having no image data in the corresponding storage position in different formats, based on the second data, a scanning unit scanning an image to generate image data, and a transmission unit transmitting, in accordance with a selection command of the second link information, the generated image data to the corresponding storage position. The at least one server includes a storage unit receiving the image data from the image processing apparatus and storing the image data in the corresponding storage position.

According to another aspect of the present invention, there is provided an image processing apparatus capable of exchanging data with at least one server over a network. The image processing apparatus includes a display, an obtaining unit obtaining from the at least one server first data containing plural pieces of link information, each link information correlates a file name of image data to a storage position of the image data, and obtaining second data containing information for identifying the link information having no image data in a corresponding storage position among the plural pieces of link information contained in the first data, a display control unit making the display selectively display first link information having image data in a corresponding storage position and second link information having no image data in the corresponding storage position in different formats, based on the second data, a scanning unit scanning an image to generate image data, and a transmission unit transmitting, in accordance with a selection command of the second link information, the generated image data to the corresponding storage position.

According to still another aspect of the present invention, there is provided an image data storing method in a network system including at least one server. The image data storing method includes the steps of: storing in the at least one server first data containing plural pieces of link information, each link information correlates a file name of image data to a storage position of the image data, obtaining second data containing information for identifying the link information having no image data in a corresponding storage position among the plural pieces of link information contained in the first data, selectively displaying first link information having image data in a corresponding storage position and second link information having no image data in the corresponding storage position in different formats, based on the second data, scanning an image to generate image data, selecting the second link information, and storing the generated image data in the corresponding storage position.

According to yet another aspect of the present invention, there is provided a computer readable medium storing an image data transmitting program for causing an image processing apparatus to transmit image data to a server over a network. Herein, the server stores first data containing plural pieces of link information, each link information correlate a file name of image data to a storage position of the image data. The image processing apparatus includes a display, a scanning unit, a transmission/reception unit exchanging data with the server over the network, and a controller controlling operations of the image processing apparatus. The image data transmitting program causes the controller to execute the steps of obtaining the first data from the server through the transmission/reception unit in accordance with a first user request, making an inquiry about existence or nonexistence of each image data specified by the link information contained in the obtained first data to the server through the transmission/reception unit in accordance with a second user request, generating second data containing information for identifying the link information having no image data in a corresponding storage position among the plural pieces of link information, based on the first data and a response to the inquiry, making the display selectively display first link information having image data in a corresponding storage position and second link information having no image data in the corresponding storage position in different formats, based on the second data, making the scanning unit scan an image to generate image data, and transmitting, in accordance with a selection command, the generated image data to the corresponding storage position through the transmission/reception unit.

According to the present invention, there are provided a network system that allows a user of an image processing apparatus to readily store image data read by the image processing apparatus at a predetermined storage position (link), the image processing apparatus, an image data storing method, and a computer readable medium recording an image data transmitting program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 conceptually shows one example of a data structure of second HTML data.

FIG. 9 conceptually shows the display unit that displays a home page updated based on the second HTML data.

FIG. 10 conceptually shows a data structure of a link status list.

FIG. 28 shows a sequence diagram of an operation outline of the network system according to a modification of the fourth embodiment.

DESCRIPTION OF THE PREFERRED EMBODIMENTS

With reference to the drawings, hereinafter, description will be given of preferred embodiments of the present invention. In the following description, identical reference symbols denote identical components and constituent elements, respectively. These identical components and constituent elements have identical designations and functions, respectively.

First Embodiment

<General Configuration of Network System 1>

Figure 1:
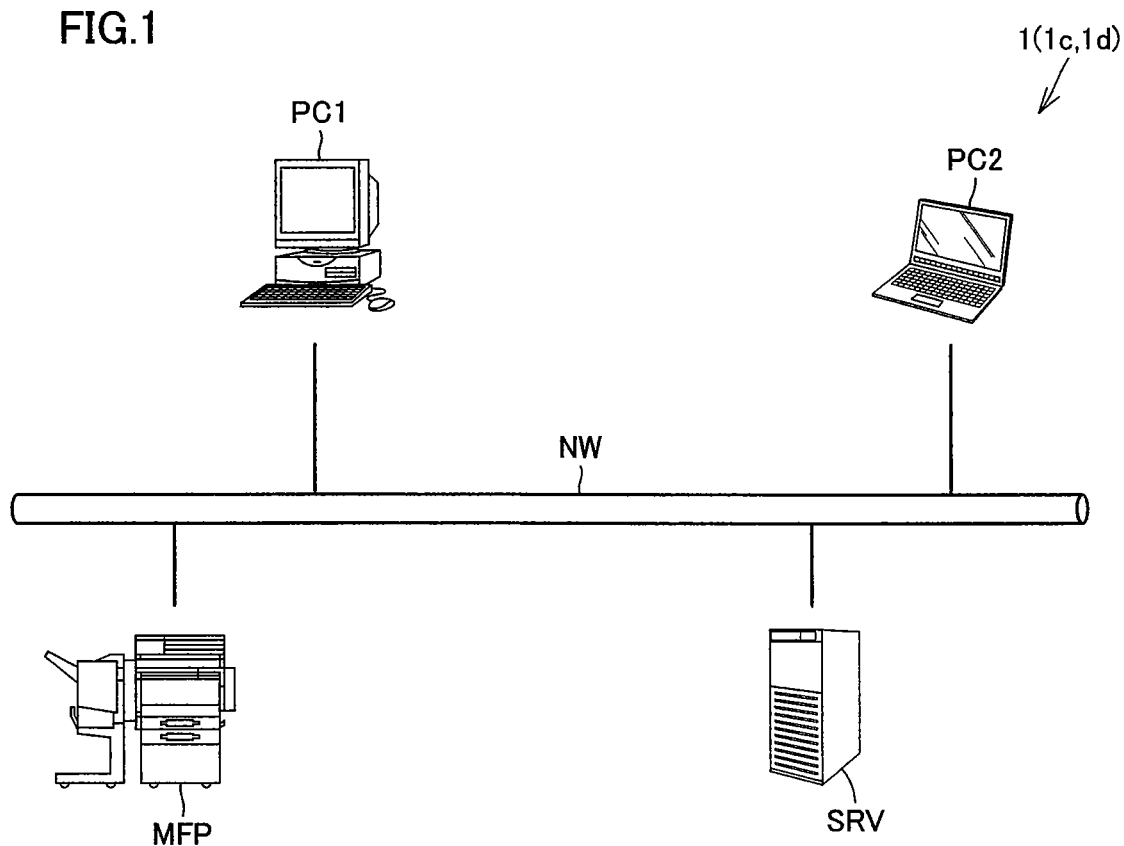
FIG. 1 schematically shows a configuration of a network system according to a first embodiment of the present invention.

First, description will be given of a general configuration of a network system 1 according to a first embodiment of the present invention. FIG. 1 schematically shows the configuration of network system 1 according to the first embodiment.

With reference to FIG. 1, network system 1 includes an image processing apparatus MFP, a server SRV, a personal computer PC1 and a personal computer PC2 which can exchange data with one another on a network NW. Herein, network NW may be a private line such as a LAN (Local Area Network) or a WAN (Wide Area Network) or a public line such as the Internet or a VPN (Virtual Private Network). Further, network NW may partly or entirely be a radio communication line such as a wireless LAN.

Typically, image processing apparatus MFP is an MFP (Multi Function Peripheral) having a plurality of functions such as a scanner function, a web browser function, a copier function and a facsimile function. Through use of the web browser function, image processing apparatus MFP receives various kinds of data (e.g., HTML data for displaying a home page) from external server SRV via network NW, and makes a display unit to display an image and a text (e.g., a home page). Moreover, image processing apparatus MFP scans an image on a paper medium, and transmits image data and text data to server SRV. Further, image processing apparatus MFP performs an image forming process based on the image data and the text data. Herein, the image forming process involves output of the data onto a paper medium, transmission of the data via fax, and the like.

Server SRV is realized by, for example, an administrative server connected to an in-house LAN, an external web server, or the like. Moreover, server SRV has a predetermined address allocated thereto, and this address is used for identifying server SRV. Further, server SRV stores various kinds of data (e.g., HTML data for displaying a home page, image data cited by HTML data), reads one of the various kinds of data in accordance with a request from image processing apparatus MFP, and transmits the read data to image processing apparatus MFP.

Each of personal computers PC1 and PC2 is connected to an in-house LAN, for example. Moreover, each of personal computers PC1 and PC2 generates new HTML data and then transmits the HTML data to server SRV. Alternatively, each of personal computers PC1 and PC2 updates HTML data stored in server SRV.

<Operation Outline of Network System 1>

Figure 2:
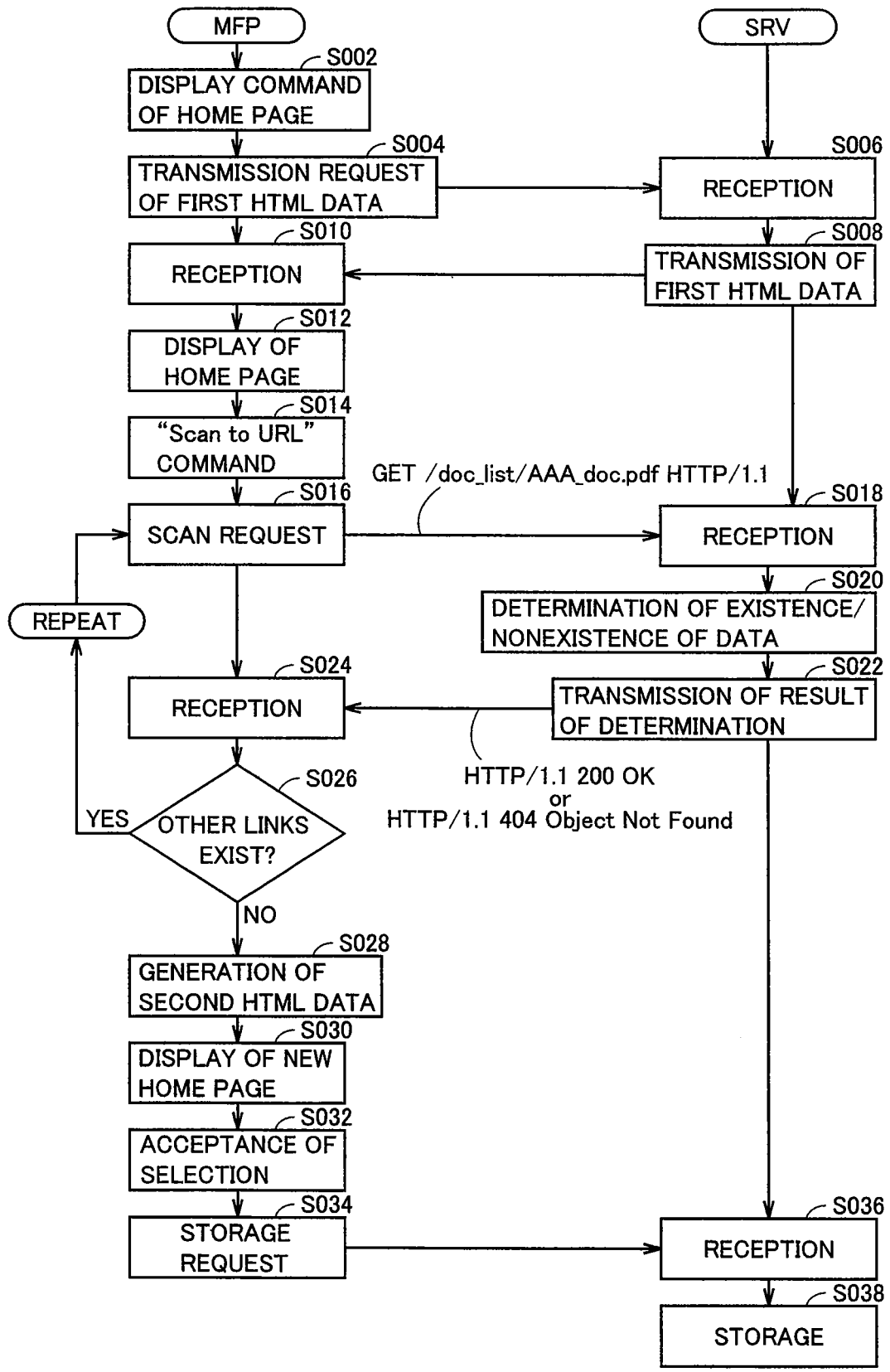
FIG. 2 shows a sequence diagram of an operation outline of the network system according to the first embodiment.

Herein, description will be given of an operation outline of network system 1 according to the first embodiment. FIG. 2 shows a sequence diagram of the operation outline of network system 1 according to the first embodiment.

As shown in FIG. 2, image processing apparatus MFP receives a command to display a home page (step S002) and issues a transmission request of HTML data (first HTML data) for display of the home page to server SRV (step S004).

Herein, a home page is a concept including not only a page which is displayed first in start-up of a browser, but also an in-house site or a web site (not limited to a top page thereof). Moreover, HTML data is one type of a PDL (Page Description Language), and the first HTML data may be other PDLs such as XML (Extensible Markup Language) data.

Server SRV receives the request from image processing apparatus MFP (step S006) and transmits the relevant first HTML data to image processing apparatus MFP (step S008).

Image processing apparatus MFP receives the first HTML data (step S010) and displays a home page based on the first HTML data (step S012). Image processing apparatus MFP accepts a command to display an inquiry about whether data is stored at a link of the displayed home page (a "Scan to URL" command, hereinafter, referred to as an inquiry command) (step S014). Upon acceptance of such an inquiry command from a user, image processing apparatus MFP makes an inquiry about first link information of the first HTML data to server SRV (step S016). In other words, image processing apparatus MFP sends, to server SRV, an inquiry request message containing an inquiry about whether data is stored at a link, an address and a file name.

Server SRV receives the inquiry request message (step S018) and determines whether data having the file name contained in the inquiry request message is stored at the address contained in the inquiry request message (step S020). Next, server SRV sends a determination result message to image processing apparatus MFP (step S022). Image processing apparatus MFP receives the determination result message (step S024) and determines whether the first HTML data to be displayed currently has link information which does not undergo the inquiry request yet (step S026). If the first HTML data to be displayed currently has link information which does not undergo the inquiry request yet (YES in step S026), image processing apparatus MFP repeats the processes in step S016 and the subsequent steps.

On the other hand, when all pieces of link information in the first HTML data to be displayed undergo the inquiry request (NO in step S026), image processing apparatus MFP generates new HTML data (second HTML data) based on the first HTML data and results of the determination from server SRV (step S028). In the second HTML data, a link in which data exists in an address of link information and a link in which no data exists in an address of link information are set in different display formats. Based on the second HTML data, image processing apparatus MFP displays a home page which is changed in display format (step S030).

Image processing apparatus MFP accepts a selection command to select a link from the user (step S032). Image processing apparatus MFP scans an image, adds to image data a file name contained in corresponding link information, and transmits the image data to an address contained in the link information (step S034). Server SRV receives the image data (step S036) and stores the image data at the address (step S038).

Hereinafter, detailed description will be given of configurations for realizing the functions described above.

<Hardware Configuration of Image Processing Apparatus MFP>

Figure 3:
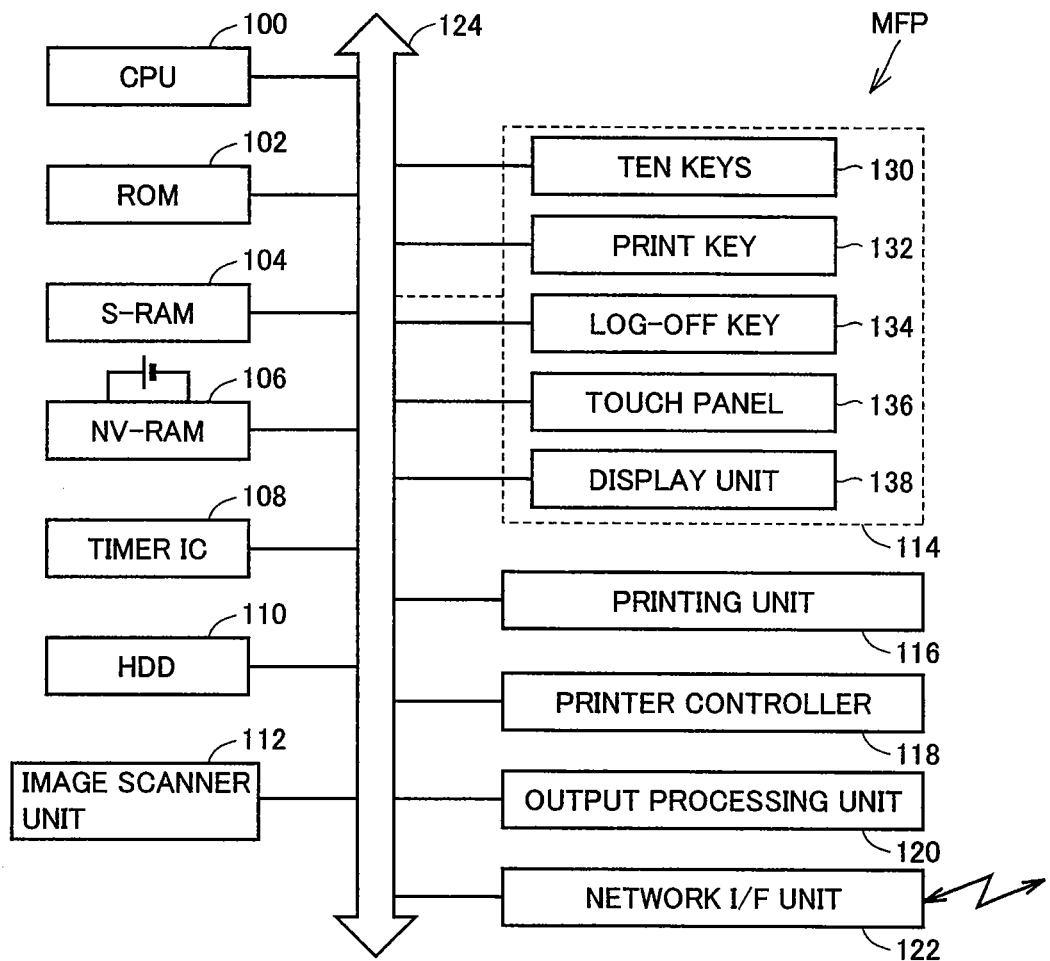
FIG. 3 schematically shows a hardware configuration of an image processing apparatus according to the first embodiment.

Next, description will be given of a hardware configuration of image processing apparatus MFP according to the first embodiment. FIG. 3 schematically shows the hardware configuration of image processing apparatus MFP according to the first embodiment.

With reference to FIG. 3, image processing apparatus MFP includes a CPU (Central Processing Unit) 100, an ROM (Read Only Memory) 102, an S-RAM (Static-Random Access Memory) 104, an NV-RAM (Non-Volatile Random Access Memory) 106, and a timer IC (Integrated Circuit) 108. These parts are connected to one another through a bus 124.

CPU 100 reads a program stored in advance in ROM 102 or the like to S-RAM 104 as a work memory and executes the program to realize the process according to the first embodiment. Further, NV-RAM 106 stores various settings related to image formation in the MFP in a non-volatile manner. Timer IC 108 is configured to include a quartz oscillator or the like and measures a current time.

Image processing apparatus MFP further includes an image scanner unit 112, an operation panel 114, a printing unit 116, a printer controller 118, and an output processing unit 120.

Image scanner unit 112 is a part for realizing the scanner function, and scans an original (image) to generate image data. Typically, image scanner unit 112 includes a loading tray for setting the original, a platen glass, a feeding unit for automatically feeding the original set on the loading tray to the platen glass one by one, and an ejection tray for ejecting the scanned original (all not shown).

Operation panel 114 includes ten-keys 130, a PRINT key 132, a log-off key 134, a touch panel 136 and a display unit 138 integrated together, and is placed on a surface portion of image processing apparatus MFP. Ten-keys 130, PRINT key 132, log-off key 134 and touch panel 136 function as an operation unit for receiving a user operation. On the other hand, display unit 138 functions as a display unit for presenting scanned images urging the user to make selection or determine various settings. Display unit 138 is typically implemented by a liquid crystal panel or the like, and touch panel 136 is arranged on the display surface of display unit 138.

Printing unit 116 is a part for performing a process of printing an image on a paper medium. Typically, printing unit 116 includes an image forming unit that includes an exposurer and a developing roller, a transfer roller that transfers a toner image formed by the image forming unit to a paper medium, a fixer that fixes the transferred toner image, and a control circuit that controls the operations of these parts.

Printer controller 118 converts print data (converted data) from server SRV or the personal computer or image data scanned by image scanner unit 112 to data suitable for the printing process performed by printing unit 116. Typically, when image processing apparatus MFP is for color processing, printer controller 118 converts print data (converted data) or image data to raster data of four colors, that is, yellow (Y), magenta (M), cyan (C) and black (K), and outputs the raster data of the respective colors to printing unit 116.

Output processing unit 120 is a part for performing various processes on the paper medium after the image is formed thereon by printing unit 116. Typically, output processing unit 120 performs a "sorting process", a "grouping process", a "stapling process" and a "punching process". Herein, the "sorting process" refers to a process in which, when a plurality of copies of a document containing a plurality of pages are to be outputted, paper media having images formed in the same page order as the original document are outputted by the set number of copies, that is, a so-called collated printing. The "grouping process" refers to a process in which paper media of the set number of copies are outputted for every page of the original document. The "stapling process" refers to a process of fastening the outputted paper media by staples. The "punching process" refers to a process of punching a hole or holes in the outputted paper media.

Image processing apparatus MFP also includes an HDD (Hard Disk Drive) 110 and a network I/F (interface) unit 122.

HDD 110 is a memory unit that stores a relatively large amount of data in a non-volatile manner. For example, HDD 110 stores various kinds of data from server SRV, data of an image scanned by image scanner unit 112, and the like. Network I/F unit 122 is a part for establishing data communications with server SRV, personal computer PC1 or personal computer PC2 on network NW.

<Hardware Configuration of Server SRV>

Figure 4:
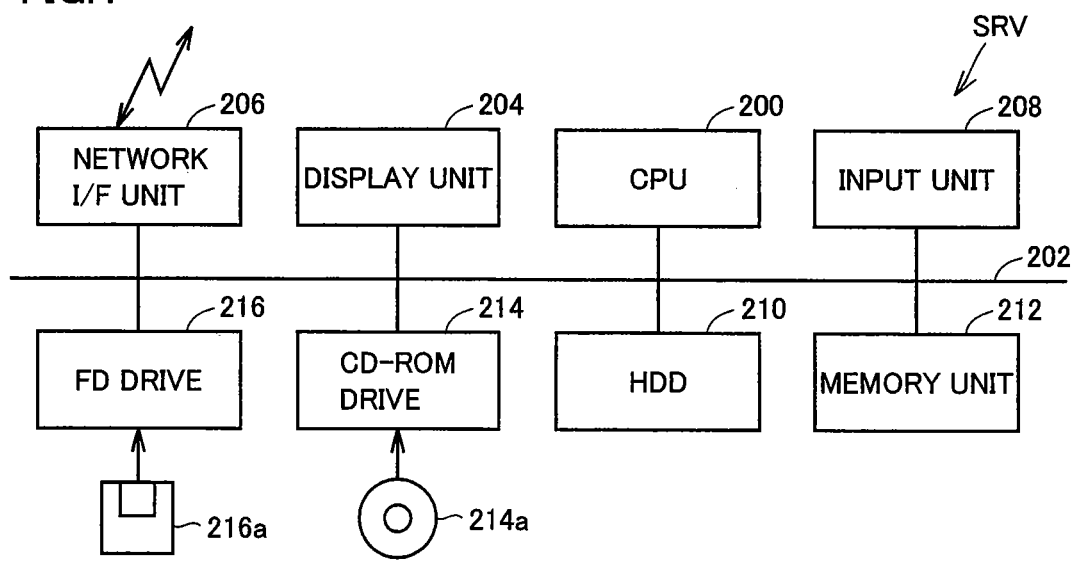
FIG. 4 schematically shows a hardware configuration of a server according to the first embodiment.

Next, description will be given of a hardware configuration of server SRV according to the first embodiment. FIG. 4 schematically shows the hardware configuration of server SRV according to the first embodiment.

With reference to FIG. 4, server SRV includes a CPU 200 that executes various programs including an operating system, a memory unit 212 that temporarily stores data required for execution of a program by CPU 200, and an HDD (Hard Disk Drive) 210 that stores the program to be executed by CPU 200 in a non-volatile manner. For example, such a program is read from a CD-ROM (Compact Disk-Read Only Memory) 214a or an FD (Flexible Disk) 216a by a CD-ROM drive 214 or an FD drive 216.

CPU 200 accepts an operation request from the user through an operation unit 208 such as a keyboard or a mouse, and provides a screen image output generated by execution of a program to a display unit 204. Further, CPU 200 establishes data communications with image processing apparatus MFP, personal computer PC1 or personal computer PC2 through a network I/F (interface) unit 206 such as an LAN card. Herein, these parts are connected to one another through an internal bus 202.

Network I/F unit 206 receives data from image processing apparatus MFP, personal computer PC1 or personal computer PC2 through network NW. In accordance with the received data, CPU 200 reads first HTML data or image data, which is requested by image processing apparatus MFP, from HDD 210, and transmits the read data to image processing apparatus MFP through network I/F unit 206. In accordance with the received data, moreover, CPU 200 makes HDD 210 to store data uploaded from image processing apparatus MFP. In accordance with the received data, further, CPU 200 updates the data stored in HDD 210 based on new data which is edited by the user of image processing apparatus MFP.

<Functional Configuration of Network System 1>

Figure 5:
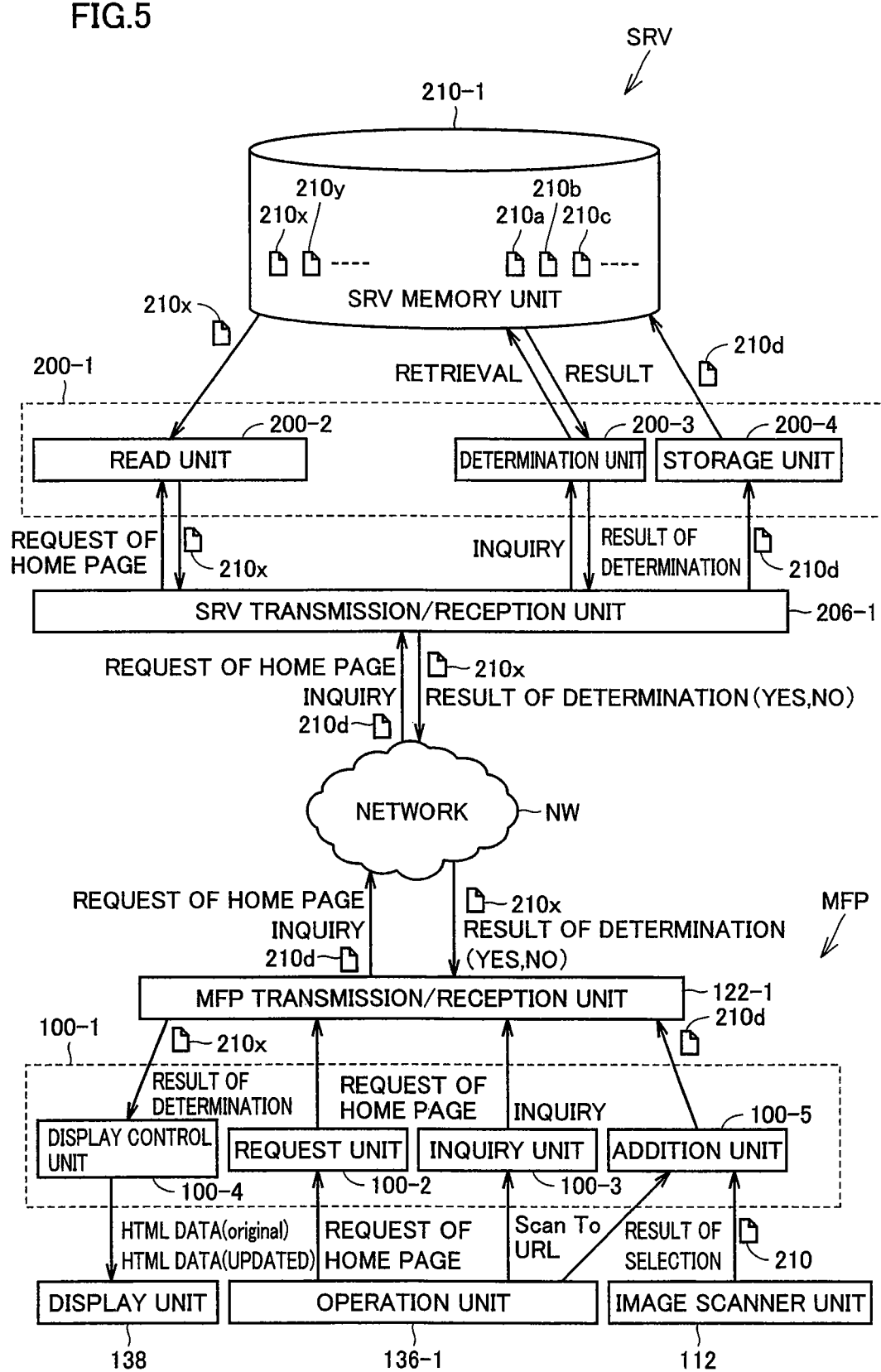
FIG. 5 shows a block diagram of functional configurations of the image processing apparatus and the server according to the first embodiment.

Next, description will be given of functional configurations of image processing apparatus MFP and server SRV according to the first embodiment. FIG. 5 shows a block diagram of the functional configurations of image processing apparatus MFP and server SRV according to the first embodiment.

(Functional Configuration of Server SRV)

With reference to FIG. 5, server SRV includes an SRV transmission/reception unit 206-1, a memory unit 210-1 and an SRV control unit 200-1.

SRV transmission/reception unit 206-1 is realized by network I/F unit 206 and the like. Moreover, SRV transmission/reception unit 206-1 exchanges data with image processing apparatus MFP on network NW.

Memory unit 210-1 is realized by HDD 210 and the like. Moreover, memory unit 210-1 stores plural pieces of first HTML data 210x and 210y each indicating a home page, plural pieces of image data 210a, 210b, 210c . . . cited by the plural pieces of first HTML data 210x and 210y, and the like.

Figure 6:
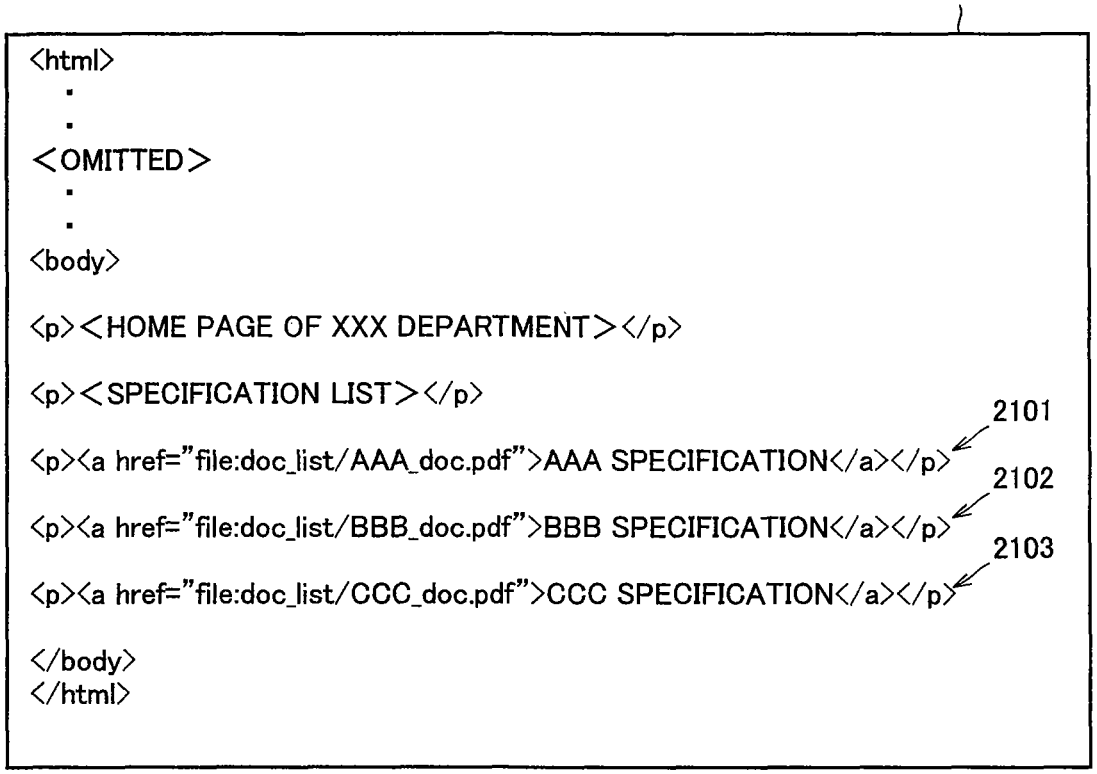
FIG. 6 conceptually shows one example of a data structure of first HTML data.

FIG. 6 conceptually shows one example of a data structure of first HTML data 210x-1. As shown in FIG. 6, first HTML data 210x-1 contains plural pieces of link information 2101, 2102 and 2103. Each of the plural pieces of link information 2101, 2102 and 2103 contains a storage address (e.g., "file: doc_list") at which image data is stored, and a file name (e.g., "AAA_doc.pdf") of the image data.

With reference to FIG. 5 again, SRV control unit 200-1 is realized by an arithmetic processing unit such as CPU 200. SRV control unit 200-1 has functions of a read unit 200-2, a determination unit 200-3, a storage unit 200-4 and the like. More specifically, the respective functions of SRV control unit 200-1 are implemented in such a manner that CPU 200 executes programs stored in HDD 210 and the like to control the hardware shown in FIG. 4. For example, the respective functions of SRV control unit 200-1 are realized in such a manner that CPU 200 transfers programs read from HDD 210 to memory unit 212 once, and then sequentially executes the programs while reading the programs from memory unit 212.

Read unit 200-2 accepts a transmission request of first HTML data through SRV transmission/reception unit 206-1, and reads the first HTML data, for example, the first HTML data shown in FIG. 6 from memory unit 210-1. Then, read unit 200-2 makes SRV transmission/reception unit 206-1 to transmit the first HTML data to image processing apparatus MFP.

Determination unit 200-3 accepts an inquiry request for every link information from image processing apparatus MFP through SRV transmission/reception unit 206-1. Moreover, determination unit 200-3 accesses memory unit 210-1 to determine whether image data having a file name contained in link information is stored at an address contained in the link information. Then, determination unit 200-3 makes SRV transmission/reception unit 206-1 to transmit a result of the determination to image processing apparatus MFP.

Storage unit 200-4 receives image data from image processing apparatus MFP through SRV transmission/reception unit 206-1 and makes memory unit 210-1 to store the image data. More specifically, storage unit 200-4 stores image data 210d having a file name added thereto at an address of a link selected by image processing apparatus MFP.

<Functional Configuration of Image Processing Apparatus MFP>

On the other hand, image processing apparatus MFP includes display unit 138, an operation unit 136-1, image scanner unit 112, an MFP transmission/reception unit 122-1 and an MFP control unit 100-1.

According to the first embodiment, display unit 138 and operation unit 136-1 are realized by operation panel 114.

According to the first embodiment, display unit 138 is realized by a monitor, a liquid crystal display or the like. For example, display unit 138 receives data from external server SRV through network NW or MFP transmission/reception unit 122-1 and displays an image based on the received data. More specifically, display unit 138 displays a home page or an image, based on a command from MFP control unit 100-1.

According to the first embodiment, operation unit 136-1 is realized by ten keys 130, PRINT key 132, log-off key 134, touch panel 136 and the like. Operation unit 136-1 accepts from the user a first command to request display of a home page. Moreover, operation unit 136-1 accepts a second command to determine whether data having a file name contained in link information is stored at an address contained in the link information. Further, operation unit 136-1 accepts a link (selectable area) selection command to attach (store) image data generated by image scanner unit 112 to (in) a page.

Image scanner unit 112 scans an image on a paper medium to generate image data. S-RAM 104, HDD 110 or the like stores the image data generated by image scanner unit 112.

MFP transmission/reception unit 122-1 is realized by a program executed by CPU 100 and network I/F unit 122. Moreover, MFP transmission/reception unit 122-1 exchanges data with server SRV on network NW. In accordance with a URL inputted through operation unit 136-1, MFP transmission/reception unit 122-1 sends to external server SRV a massage for requesting transmission of first HTML data. Based on the first HTML data, MFP transmission/reception unit 122-1 issues a transmission request of image data to external server SRV. In accordance with a command inputted through operation unit 136-1, MFP transmission/reception unit 122-1 sends various inquiry messages to server SRV. Then, MFP transmission/reception unit 122-1 transmits the image data based on link information corresponding to a link selected through operation unit 136-1. That is, MFP transmission/reception unit 122-1 transmits the image data to an address contained in the selected link information.

MFP control unit 100-1 is realized by an arithmetic processing unit such as CPU 100. MFP control unit 100-1 has functions of a request unit 100-2, an inquiry unit 100-3, a display control unit 100-4, an addition unit 100-5 and the like. More specifically, the respective functions of MFP control unit 100-1 are implemented in such a manner that CPU 100 executes programs stored in S-RAM 104 and the like to control the hardware shown in FIG. 3. For example, the respective functions of MFP control unit 100-1 are realized in such a manner that CPU 100 transfers programs stored in HDD 110 to S-RAM 104 once, and then sequentially executes the programs while reading the programs from S-RAM 104.

In accordance with a command to display a home page (first command), which is inputted through operation unit 136-1, request unit 100-2 obtains first HTML data from server SRV through WP transmission/reception unit 122-1. Based on URL information inputted through operation unit 136-1, more specifically, request unit 100-2 sends a request message for requesting transmission of first HTML data to server SRV through MFP transmission/reception unit 122-1.

Inquiry unit 100-3 accepts a command to determine whether data is stored at a link of a home page (second command) through operation unit 136-1. In accordance with the second command, inquiry unit 100-3 sends an inquiry request message for making an inquiry about whether image data having a file name contained in link information is stored at an address contained in the link information to server SRV through MFP transmission/reception unit 122-1 for every link information contained in the first HTML data in descending order of position in the first HTML data.

Figure 7:
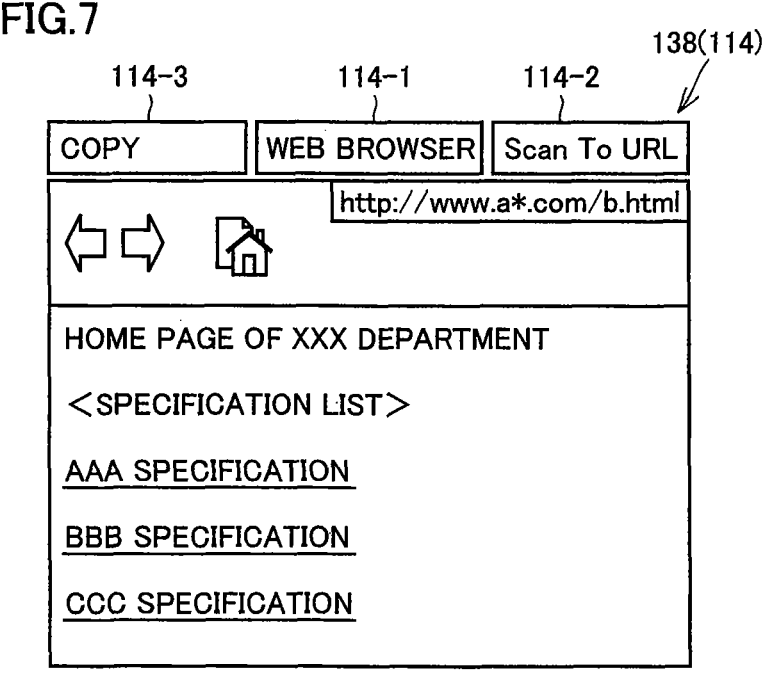
FIG. 7 conceptually shows a display unit that displays a home page based on the first HTML data.

Display control unit 100-4 makes display unit 138 to display a home page (first page), based on first HTML data. FIG. 7 conceptually shows display unit 138 that displays the home page based on the first HTML data. As shown in FIG. 7, display control unit 100-4 makes display unit 138 to display the home page, based on the first HTML data shown in FIG. 6.

With reference to FIG. 5 again, display control unit 100-4 obtains second HTML data indicating a new home page (second page). In the second page, a link in which image data having a corresponding file name exists in a corresponding storage position and a link in which image data having a corresponding file name does not exist in a corresponding storage position are displayed in different display formats. Then, display control unit 100-4 makes display unit 138 to display the new home page based on the second HTML data.

More specifically, display control unit 100-4 generates second HTML data based on first HTML data and a result of determination (result of inquiry) from server SRV received through MFP transmission/reception unit 122-1, and makes display unit 138 to display a second page based on the second HTML data.

More specifically, display control unit 100-4 receives, from server SRV, a result of determination whether image data having a file name contained in link information is stored at an address contained in the link information, for every link information contained in first HTML data. Based on the determination result, display control unit 100-4 changes the first HTML data, and generates second HTML data. In the second HTML data, a display format of a selectable area corresponding to a link in which image data having a file name contained in link information is not stored at an address contained in the link information is different from a display format of a link in which image data having a file name contained in link information is stored at an address contained in the link information.

FIG. 8 conceptually shows one example of a data structure of second HTML data 210x-2. In a case where image data having a file name "AAA_doc.pdf" is not stored at an address "file:doc_list", display control unit 100-4 generates second HTML data 210x-2 in which a corresponding link is changed in display format. As shown in FIG. 8, more specifically, display control unit 100-4 attaches a strikeout to a link having no image data stored thereat, or changes a font or a character color of the link. Alternatively, display control unit 100-4 may attach the strikeout to a link having image data stored thereat, or may change a font or a character color of the link.

As shown in FIG. 8, in a case where image data having a file name "CCC_doc.pdf" is not stored at an address "file:doc_list", display control unit 100-4 changes a display format of a corresponding link in second HTML data 210x-2 as in the foregoing manner.

FIG. 9 conceptually shows display unit 138 that displays the home page (second page) updated based on second HTML data 210x-2. As shown in FIG. 9, display control unit 100-4 makes display unit 138 to display the new page based on second HTML data 210x-2 shown in FIG. 8. In the state that display control unit 100-4 makes display unit 138 to display the new page, operation unit 136-1 accepts a link selection command from the user. In other words, operation unit 136-1 awaits a selection command from the user in order to select a link at which image data generated by image scanner unit 112 is to be stored.

FIG. 10 conceptually shows a data structure of a link status list 104-1. As shown in FIG. 10, in a state that display control unit 100-4 makes display unit 138 to display an updated home page, display control unit 100-4 stores, in S-RAM 104-1, an address at which image data is stored, a file name of the image data, a pressing range on operation unit 136-1 and a link status (information about whether image data having a file name contained in link information is stored at an address contained in the link information) for every link information contained in second HTML data 210x-2. As described above, operation unit 136-1 accesses link status list 104-1 to recognize a link selected by the user.

With reference to FIG. 5 again, addition unit 100-5 accepts a selection command from the user through operation unit 136-1, adds a file name contained in selected link information to image data and creates an image file. Addition unit 100-5 transmits the image file to an address contained in the selected link information, through MFP transmission/reception unit 122-1. In other words, addition unit 100-5 stores the image file at the address.

As described above, request unit 100-2, inquiry unit 100-3 and display control unit 100-4 realize an acquisition unit that obtains first HTML data and a result of inquiry from server SRV through MFP transmission/reception unit 122-1 to generate second HTML data. More specifically, request unit 100-2 realizes a first acquisition unit that issues a transmission request of first HTML data to server SRV through MFP transmission/reception unit 122-1 to obtain the first HTML data from server SRV. On the other hand, inquiry unit 100-3 and display control unit 100-4 realize a second acquisition unit that makes an inquiry to server SRV through MFP transmission/reception unit 122-1, obtains a result of the inquiry from server SRV and generates second HTML data.

<Home Page Displaying Process in Image Processing Apparatus MFP>

Figure 11:
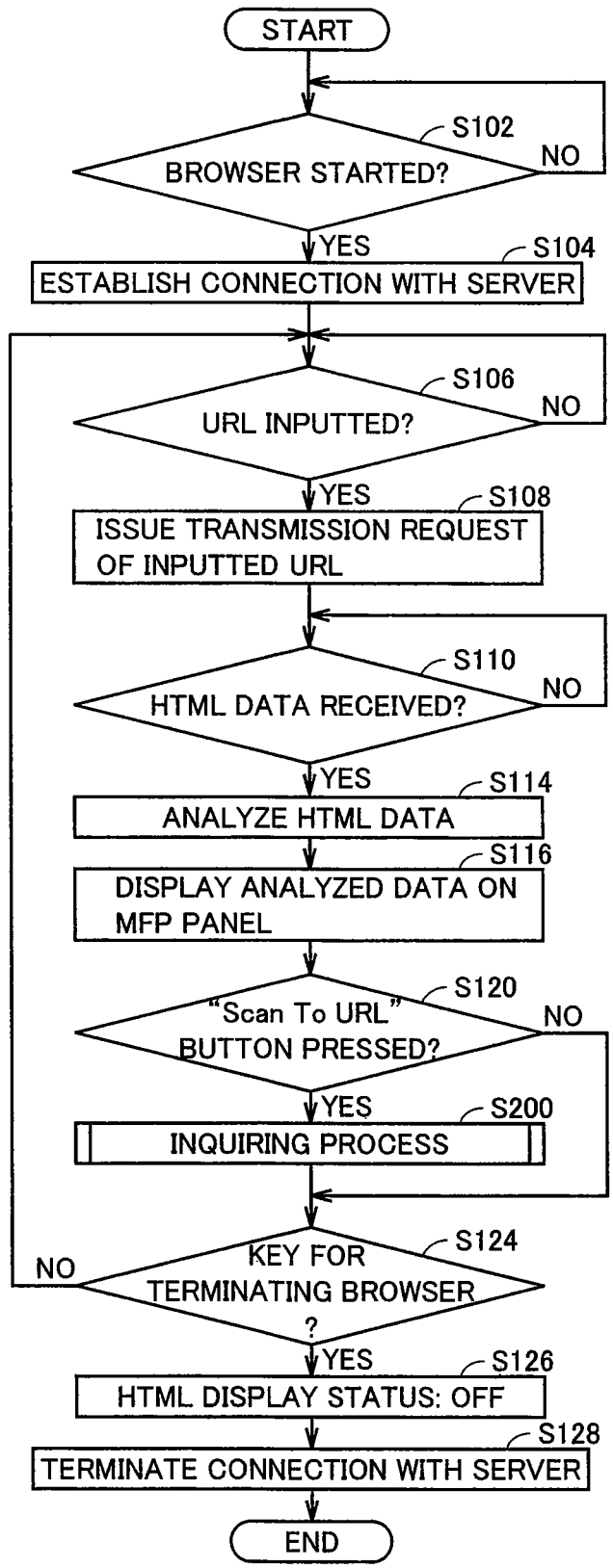
FIG. 11 shows a flowchart of a procedure of a home page displaying process in the image processing apparatus according to the first embodiment.

Next, description will be given of a home page displaying processing in image processing apparatus MFP. FIG. 11 shows a flowchart of a procedure of the home page displaying process in image processing apparatus MFP. As shown in FIG. 11, for example, when the user inputs a command to start up a web browser through operation panel 114 (YES in step S102), that is, when the user presses a web browser button 114-1 on operation panel 114 shown in FIG. 7, CPU 100 performs a process of establishing connection with server SRV through network I/F unit 122 (step S104). When the user inputs a URL through touch panel 136 or when the user selects desired one of URLs stored in advance (YES in step S106), CPU 100 issues a transmission request of first HTML data of the inputted URL to server SRV through network I/F unit 122 (step S108).

When CPU 100 receives the first HTML data from server SRV through network I/F unit 122 (YES in step S110), then, CPU 100 analyzes the first HTML data (step S114) and makes display unit 138 to display a home page (step S116). In this state, when the user presses a "Scan To URL" button 114-2 on operation panel 114 shown in FIG. 7 (YES in step S120), CPU 100 performs an inquiring process (step S200). Description of the inquiring process (step S200) will be given later.

Thereafter, when the user inputs a command to terminate the web browser function (YES in step S124), CPU 100 terminates display of the home page based on the first HTML data (step S126). For example, when the user presses a copy button 114-3 shown in FIG. 7, CPU 100 terminates the display of the home page (step S126). Next, CPU 100 terminates the connection with server SRV (step S128).

On the other hand, if the user inputs no command to terminate the web browser function (NO in step S124), CPU 100 repeats the processes in step S106 and the subsequent steps.

<Inquiring Process>

Figure 12:
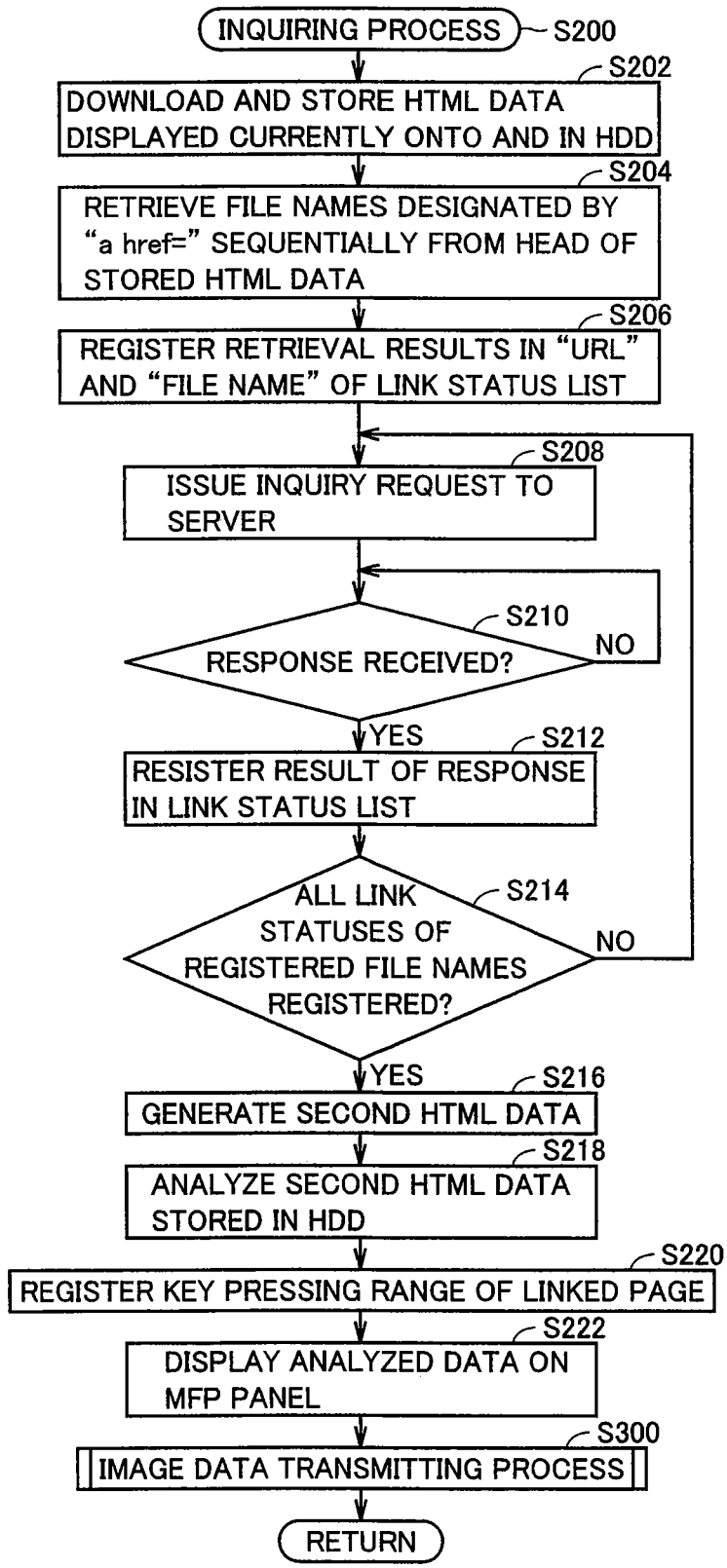
FIG. 12 shows a flowchart of a procedure of an inquiring process in the image processing apparatus according to the first embodiment.

Next, description will be given of the inquiring process (step S200) in image processing apparatus MFP. FIG. 12 shows a flowchart of a procedure of the inquiring process (step S200) in image processing apparatus MFP. As shown in FIG. 12, CPU 100 makes display unit 138 to store the displayed first HTML data in HDD 110 (step S202). Next, CPU 100 retrieves link information contained in the first HTML data (step S204). More specifically, CPU 100 extracts file names designated by "a href=" sequentially from a head of the first HTML data. Next, CPU 100 registers a result of the retrieval in link status list 104-1 (step S206). In other words, CPU 100 registers the link information designated by "a href=" in link status list 104-1.

Next, CPU 100 makes an inquiry about whether data exists in a link for every link information registered in link status list 104-1 to server SRV through network I/F unit 122 (step S208). When CPU 100 receives a result of the inquiry (result of determination) from server SRV (YES in step S210), then, CPU 100 stores the inquiry result in link status list 104-1 (step S212). In other words, server SRV transmits to image processing apparatus MFP a result of the inquiry about whether data exists in a link. CPU 100 determines whether link statuses of all pieces of link information registered in link status list 104-1 are stored (step S214). If the link statuses of all the file names registered in link status list 104-1 are not stored yet (NO in step S214), CPU 100 repeats the processes in step S208 and the subsequent steps.

On the other hand, if the link statuses of all the file names registered in link status list 104-1 are stored (YES in step S214), CPU 100 generates new HTML data (second HTML data) based on link status list 104-1 and the first HTML data (step S216). Next, CPU 100 analyzes the second HTML data (step S218). Herein, CPU 100 registers a key pressing range in link status list 104-1 for every link information contained in the second HTML data (step S220). CPU 100 makes display unit 138 to display a new home page (second page) based on the second HTML data (step S222). Thereafter, CPU 100 performs an image data transmitting process (step S300).

<Image Data Transmitting Process>

Figure 13:
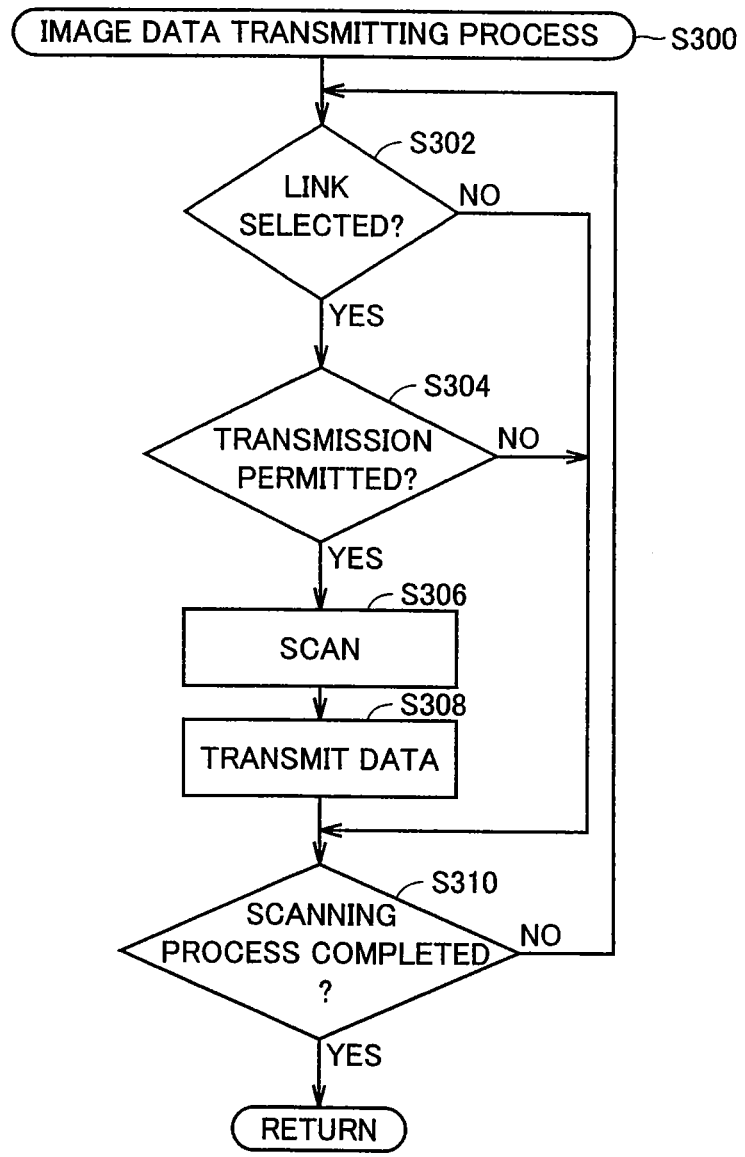
FIG. 13 shows a flowchart of a procedure of an image data transmitting process in the image processing apparatus according to the first embodiment.

Next, description will be given of the image data transmitting process in image processing apparatus MFP. FIG. 13 shows a flowchart of a procedure of the image data transmitting process in image processing apparatus MFP. As shown in FIG. 13, when CPU 100 accepts a command to select a link through operation unit 136-1 (YES in step S302), then, CPU 100 urges the user to make a choice whether to transmit image data (step S304). When the user inputs a command to transmit image data (YES in step S304), image scanner unit 112 scans an image (step S306). Next, CPU 100 transmits image data scanned by image scanner unit 112 to server SRV through network I/F unit 122 (step S308).

Thereafter, when operation unit 136-1 accepts a command to complete the inquiring process (YES in step S310), that is, when the user presses copy button 114-3 or web browser button 114-2 on operation panel 114, CPU 100 completes the image data transmitting process (step S300). Then, CPU 100 also completes the inquiring process (step S200).

<Image Data Storing Process in Server SRV>

Figure 14:
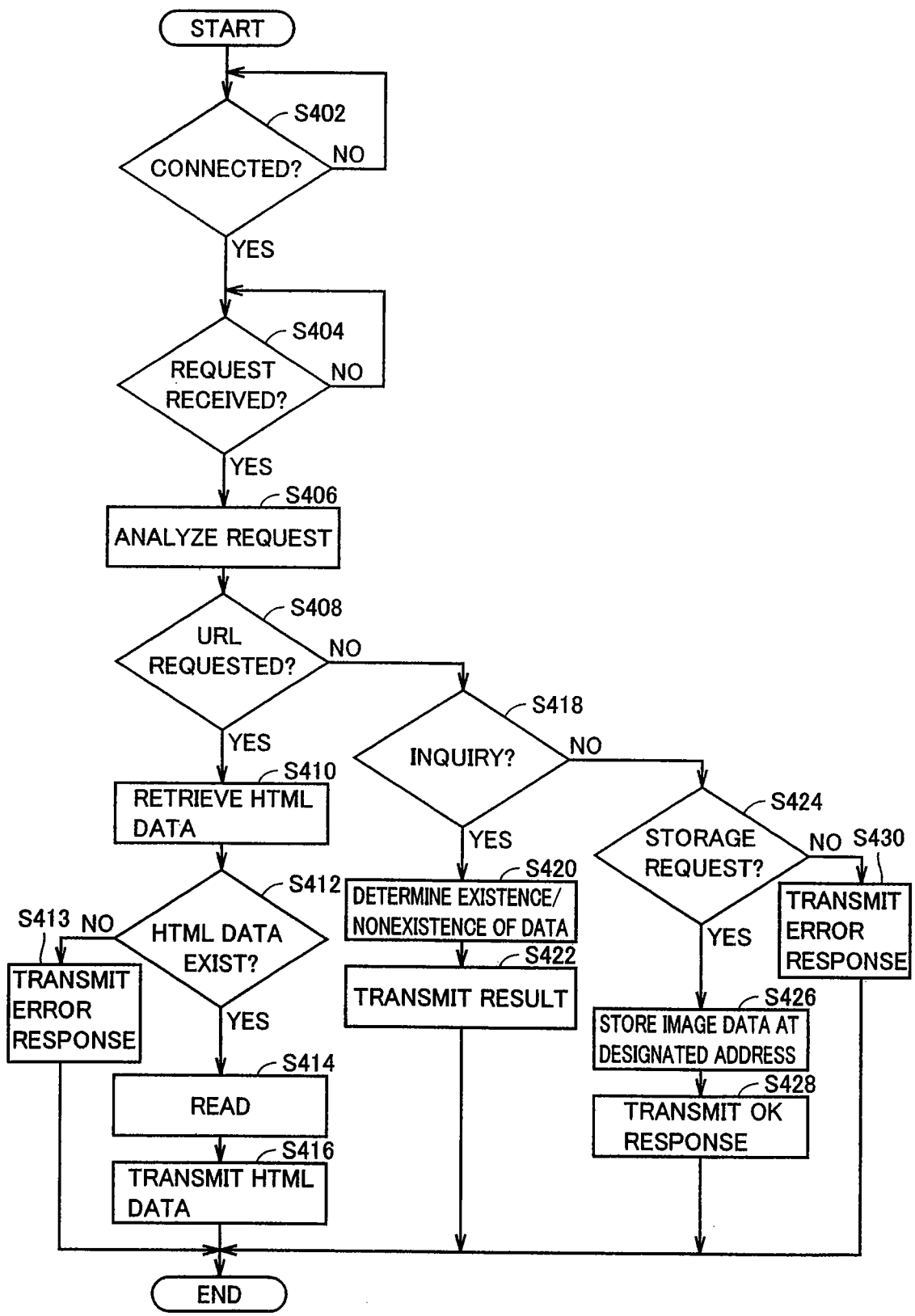
FIG. 14 shows a flowchart of a procedure of an image data storing process in the server according to the first embodiment.

Next, description will be given of an image data storing process in server SRV. FIG. 14 shows a flowchart of a procedure of the image data storing process in server SRV. As shown in FIG. 14, CPU 200 awaits a connection request from image processing apparatus MFP (step S402). When CPU 200 receives the connection request from image processing apparatus MFP (YES in step S402), then, CPU 200 determines whether to receive a certain request message from image processing apparatus MFP (step S404). When CPU 200 receives a request message from image processing apparatus MFP (YES in step S404), then, CPU 200 analyzes the request message (step S406).

Herein, examples of the request message include the request message transmitted from image processing apparatus MFP in step S108 shown in FIG. 11 and the request message transmitted from image processing apparatus MFP in step S208 shown in FIG. 12.

If the request message from image processing apparatus MFP is a transmission request of first HTML data (YES in step S408), CPU 200 accesses HDD 210 to retrieve the relevant first HTML data based on an address and a file name each contained in the request message (step S410). If the relevant first HTML data is stored in HDD 210 (YES in step S412), CPU 200 reads the first HTML data from HDD 210 (step S414), and transmits the first HTML data to image processing apparatus MFP through network I/F unit 206 (step S416). If the relevant first HTML data is not stored in HDD 210 (NO in step S412), CPU 200 sends an error message to image processing apparatus MFP through network I/F unit 206 (step S413).

On the other hand, if the request message from image processing apparatus MFP is not a transmission request of first HTML data (NO in step. S408), CPU 200 determines whether the request message from image processing apparatus WP is an inquiry for examining existence/nonexistence of image data (step S418). If the request message from image processing apparatus MFP is the inquiry for examining existence/nonexistence of the image data (YES in step S418), CPU 200 determines, based on an address and a file name each contained in the inquiry message from image processing apparatus MFP, whether image data having the file name is stored at the address (step S420). Next, CPU 200 transmits a result of the determination to image processing apparatus MFP through network I/F unit 206 (step S422).

On the other hand, if the request message from image processing apparatus MFP is not an inquiry for examining existence/nonexistence of image data (NO in step S418), CPU 200 determines whether the request message from image processing apparatus MFP is a storage request of image data (step S424). If the request message from image processing apparatus MFP is a storage request of image data (YES in step S424), CPU 200 stores the image data at a designated address contained in the storage request (step S426) and transmits information about completion of the storing process to image processing apparatus MFP (step S428). On the other hand, if the request message from image processing apparatus MFP is not a storage request of image data (NO in step S424), CPU 200 sends an error message to image processing apparatus MFP through network I/F unit 206 (step S430).

Second Embodiment

Next, description will be given of a second embodiment of the present invention. According to the first embodiment, network system 1 has the configuration that first HTML data and image data cited by the first HTML data are stored in single server SRV. According to the second embodiment, on the other hand, a network system 1b has a configuration that first HTML data is stored in a server SRV1 and image data cited by the first HTML data is stored in a server SRV2 which is different from server SRV1.

Figure 15:
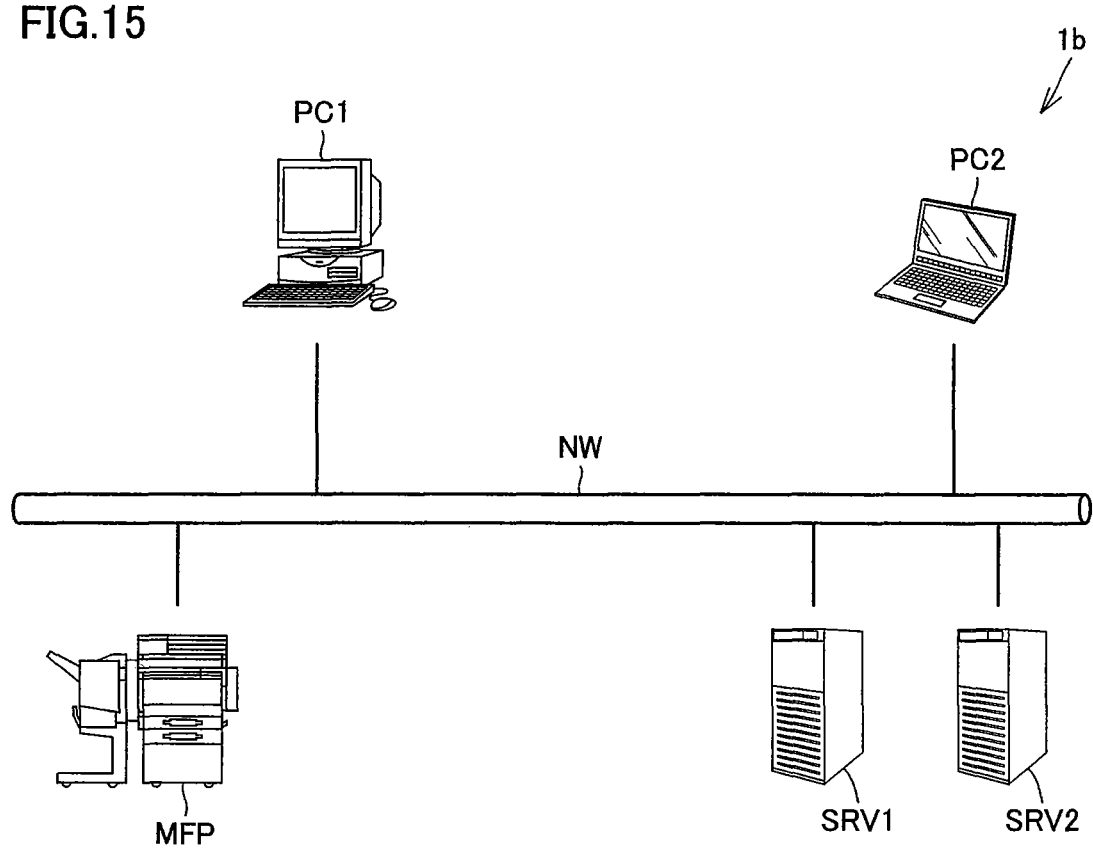
FIG. 15 schematically shows a configuration of a network system according to a second embodiment of the present invention.

First, description will be given of a general configuration of network system 1b according to the second embodiment. FIG. 15 schematically shows the configuration of network system 1b according to the second embodiment.

With reference to FIG. 15, network system 1b includes an image processing apparatus MFP, servers SRV1 and SRV2 each connected to image processing apparatus MFP through a network NW, and personal computers PC1 and PC2 each connected to image processing apparatus MFP through network NW. According to the second embodiment, server SRV1 stores first HTML data and server SRV2 stores image data.

A hardware configuration of image processing apparatus MFP and hardware configurations of servers SRV1 and SRV2 according to the second embodiment are similar to that of image processing apparatus MFP and that of server SRV according to the first embodiment, respectively; therefore, description thereof will not be given here repeatedly. In the following, mainly, description will be given of functions of and process procedures in image processing apparatus MFP as well as functions of and process procedures in each of servers SRV1 and SRV2 according to the second embodiment.

<Operation Outline of Network System 1b>

Figure 16:
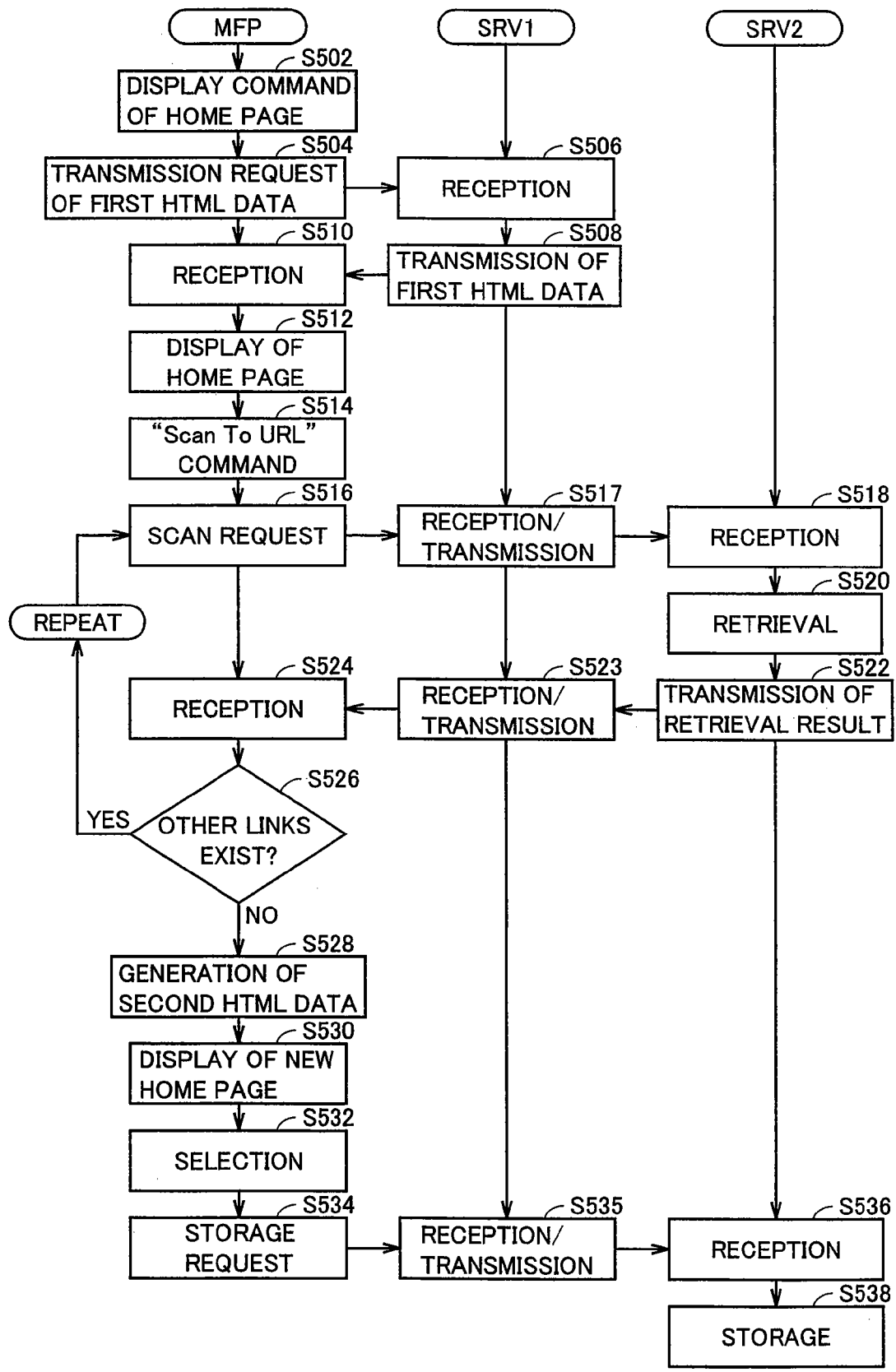
FIG. 16 shows a sequence diagram of an operation outline of the network system according to the second embodiment.

Herein, description will be given of an operation outline of network system 1b according to the second embodiment. FIG. 16 shows a sequence diagram of the operation outline of network system 1b according to the second embodiment. The operation outline of network system 1b according to the second embodiment (FIG. 16) is different from that of network system 1 according to the first embodiment (FIG. 2). Specifically, steps S516 to S524 shown in FIG. 16 are different from steps S016 to S024 shown in FIG. 2.

As shown in FIG. 16, when image processing apparatus MFP receives a command to display a home page (step S502), then, image processing apparatus MFP issues a transmission request of first HTML data for displaying a home page to server SRV1 (step S504). Server SRV1 receives the request (step S506) and transmits the relevant first HTML data to image processing apparatus MFP (step S508).

Image processing apparatus MFP receives the first HTML data (step S510) and displays a home page based on the first HTML data (step S512). Next, image processing apparatus MFP accepts an inquiry command to display an inquiry about whether data is stored at a link of the displayed home page (step S514). Upon reception of the inquiry command, image processing apparatus MFP issues an inquiry request about first link information in the first HTML data to server SRV1 (step S516). That is, image processing apparatus MFP sends to server SRV1 an inquiry request message containing an inquiry about whether data is stored at a link, an address and a file name.

Server SRV1 sends the inquiry request message to server SRV2 (step S517). Server SRV2 receives the inquiry request message (step S518) and determines whether data having the file name contained in the inquiry request message is stored at the address contained in the inquiry request message (step S520). Next, server SRV2 sends a determination result message to server SRV1 (step S522). Server SRV1 sends the determination result message to image processing apparatus MFP (step S523). Image processing apparatus MFP receives the determination result message (step S524) and determines whether the first HTML data to be displayed has link information which does not undergo the inquiry request yet (step S526). If the first HTML data to be displayed has link information which does no undergo the inquiry request yet (YES in step S526), image processing apparatus MFP repeats the processes in step S516 and the subsequent steps.

On the other hand, when all pieces of link information in the first HTML data to be displayed undergo the inquiry request (NO in step S526), image processing apparatus MFP generates new HTML data (second HTML data) based on the first HTML data received from server SRV1 and results of the determination received from server SRV2 (step S528). In the second HTML data, a link in which data exists in an address of link information and a link in which no data exists in an address of link information are set in different display formats. Next, image processing apparatus MFP displays a home page which is changed in display format, based on the second HTML data (step S530).

Next, image processing apparatus MFP accepts a selection command to select a link from a user (step S532). Next, image processing apparatus MFP scans an image, adds a file name contained in corresponding link information to image data, and transmits the image data to an address contained in the link information (step S534). Server SRV2 receives the image data (step S536) and stores the image data at the address (step S538).

According to the second embodiment, network system 1b has the configuration that image processing apparatus MFP can be connected to server SRV2 through server SRV1. Alternatively, network system 1b may have a configuration that image processing apparatus MFP is directly connected to server SRV2.

Hereinafter, detailed description will be given of configurations for realizing the functions described above.

<Functional Configuration of Network System 1b>

Figure 17:
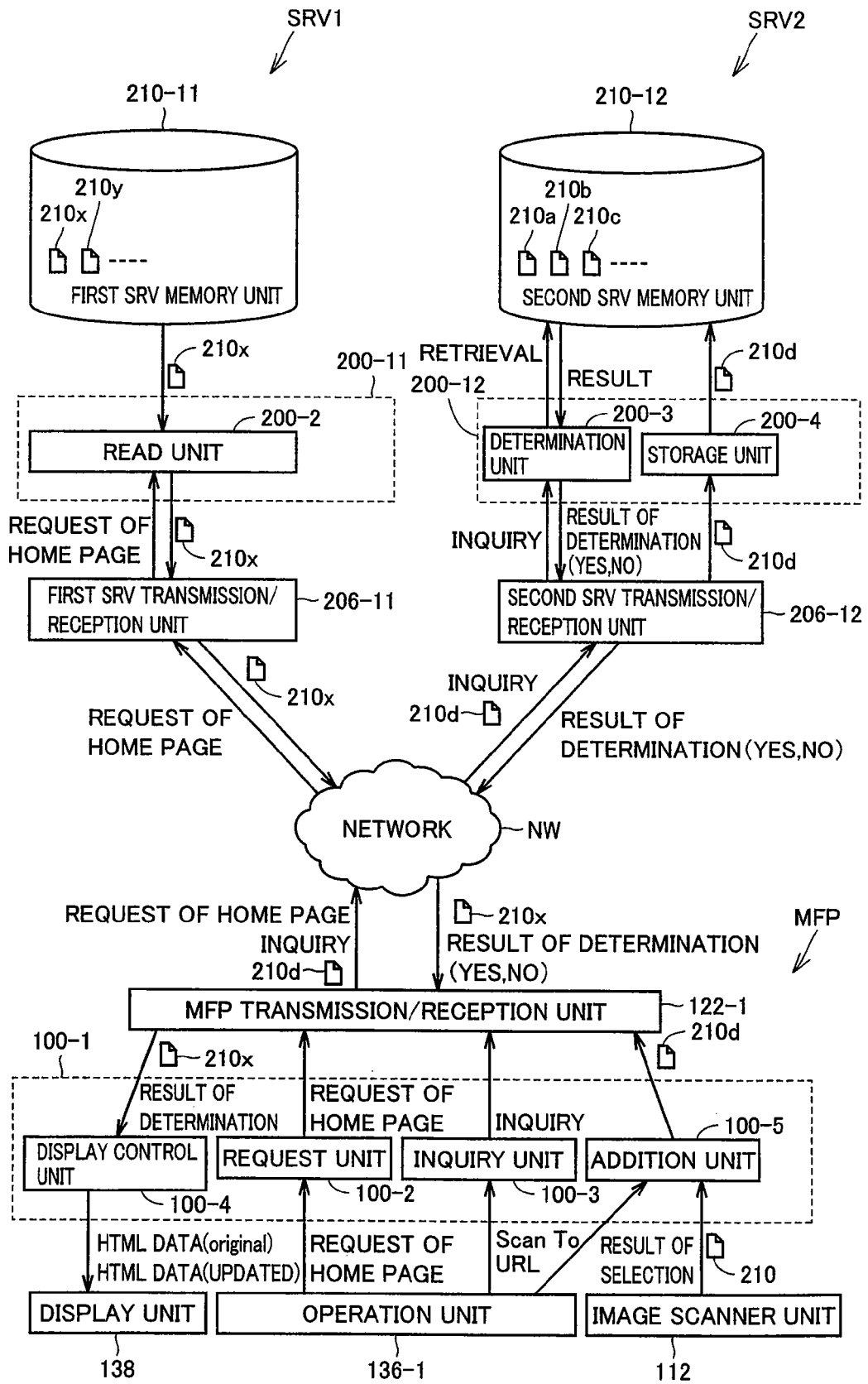
FIG. 17 shows a block diagram of functional configurations of an image processing apparatus and servers according to the second embodiment.

Next, description will be given of functional configurations of image processing apparatus MFP, server SRV1 and server SRV2 according to the second embodiment. FIG. 17 shows a block diagram of the functional configurations of image processing apparatus MFP, server SRV1 and server SRV2 according to the second embodiment.

(Functional Configuration of Server SRV1)

With reference to FIG. 17, server SRV1 includes a first SRV transmission/reception unit 206-11, a first memory unit 210-11 and a first SRV control unit 200-11.

First SRV transmission/reception unit 206-11 is realized by a network I/F unit 206 and the like. Moreover, first SRV transmission/reception unit 206-11 exchanges data with image processing apparatus MFP on network NW.

First memory unit 210-11 is realized by an HDD 210 and the like. Moreover, first memory unit 210-11 stores plural pieces of first HTML data 210x and 210y each indicating a home page. The first HTML data is similar in data structure to that shown in FIG. 6; therefore, description thereof will not be given here repeatedly.

First SRV control unit 200-11 is realized by an arithmetic processing unit such as a CPU 200. Moreover, first SRV control unit 200-11 has functions of a read unit 200-2 and the like. Read unit 200-2 accepts a transmission request of first HTML data through first SRV transmission/reception unit 206-11, reads the first HTML data from first memory unit 210-11, and makes first SRV transmission/reception unit 206-11 to transmit the first HTML data to image processing apparatus MFP.

(Functional Configuration of Server SRV2)

Server SRV2 includes a second SRV transmission/reception unit 206-12, a second memory unit 210-12 and a second SRV control unit 200-12.

Second SRV transmission/reception unit 206-12 exchanges data with image processing apparatus MFP on network NW.

Second memory unit 210-2 stores plural pieces of image data 210a, 210b, 21c . . . to be cited by the plural pieces of first HTML data 210x and 210y.

Second SRV control unit 200-12 has functions of a determination unit 200-3, a storage unit 200-4 and the like.

Determination unit 200-3 receives an inquiry request for every link information from image processing apparatus MFP through second SRV transmission/reception unit 206-12, and accesses second memory unit 210-12 to determine whether image data having a file name contained in link information is stored at an address contained in the link information. Next, determination unit 200-3 makes second SRV transmission/ reception unit 206-1 to transmit results of the determination to image processing apparatus MFP.

Storage unit 200-4 receives image data from image processing apparatus MFP through second SRV transmission/ reception unit 206-12, and stores the image data in second memory unit 210-12. Specifically, storage unit 200-4 stores image data 210d having a file name added thereto at an address of a link selected by image processing apparatus MFP.

(Functional Configuration of Image Processing Apparatus MFP)

On the other hand, a functional configuration of image processing apparatus MFP according to the second embodiment is similar to that of image processing apparatus MFP according to the first embodiment (FIG. 5); therefore, description thereof will not be given here repeatedly.

However, a request unit 100-2 accepts a command to display a home page (first command) through an operation unit 136-1, and obtains first HTML data from server SRV1 through an MFP transmission/reception unit 122-1 based on the first command. More specifically, request unit 100-2 accepts URL information through operation unit 136-1, and makes MFP transmission/reception unit 122-1 to transmit a request message for requesting transmission of first HTML data containing a predetermined address to server SRV1 based on the URL information.

Inquiry unit 100-3 accepts a command to determine whether data is stored in a link of a home page (second command) through operation unit 136-1. Based on the second command, inquiry unit 100-3 sends a message for making an inquiry about whether image data having a file name contained in link information is stored at an address contained in the link information to second server SRV2 through MFP transmission/reception unit 122-1 for every link information contained in the first HTML data in descending order of position in the first HTML data.

As described above, request unit 100-2, inquiry unit 100-3 and a display control 100-4 realize an acquisition unit that obtains first HTML data from server SRV1 through MFP transmission/reception unit 122-1 and an inquiry result from server SRV2 through MFP transmission/reception unit 122-1 to generate second HTML data. More specifically, request unit 100-2 realizes a first acquisition unit that issues a transmission request of first HTML data to server SRV1 through MFP transmission/reception unit 122-1 and obtains the first HTML data from server SRV1 through MFP transmission/reception unit 122-1. On the other hand, inquiry unit 100-3 and display control unit 100-4 realize a second acquisition unit that makes an inquiry to server SRV2 through MFP transmission/reception unit 122-1, obtains a result of the inquiry from server SRV2 through MFP transmission/reception unit 122-1 and generates second HTML data.

<Home Page Displaying Process, Inquiring Process and Image Data Transmitting Process in Image Processing Apparatus MFP>

Procedures of a home page displaying process, an inquiring process and an image data transmitting process in image processing apparatus MFP according to the second embodiment are similar to those in image processing apparatus MFP according to the first embodiment (FIGS. 11 to 13); therefore, description thereof will not be given here repeatedly.

<HTML Data Transmitting Process in Server SRV1>

Figure 18:
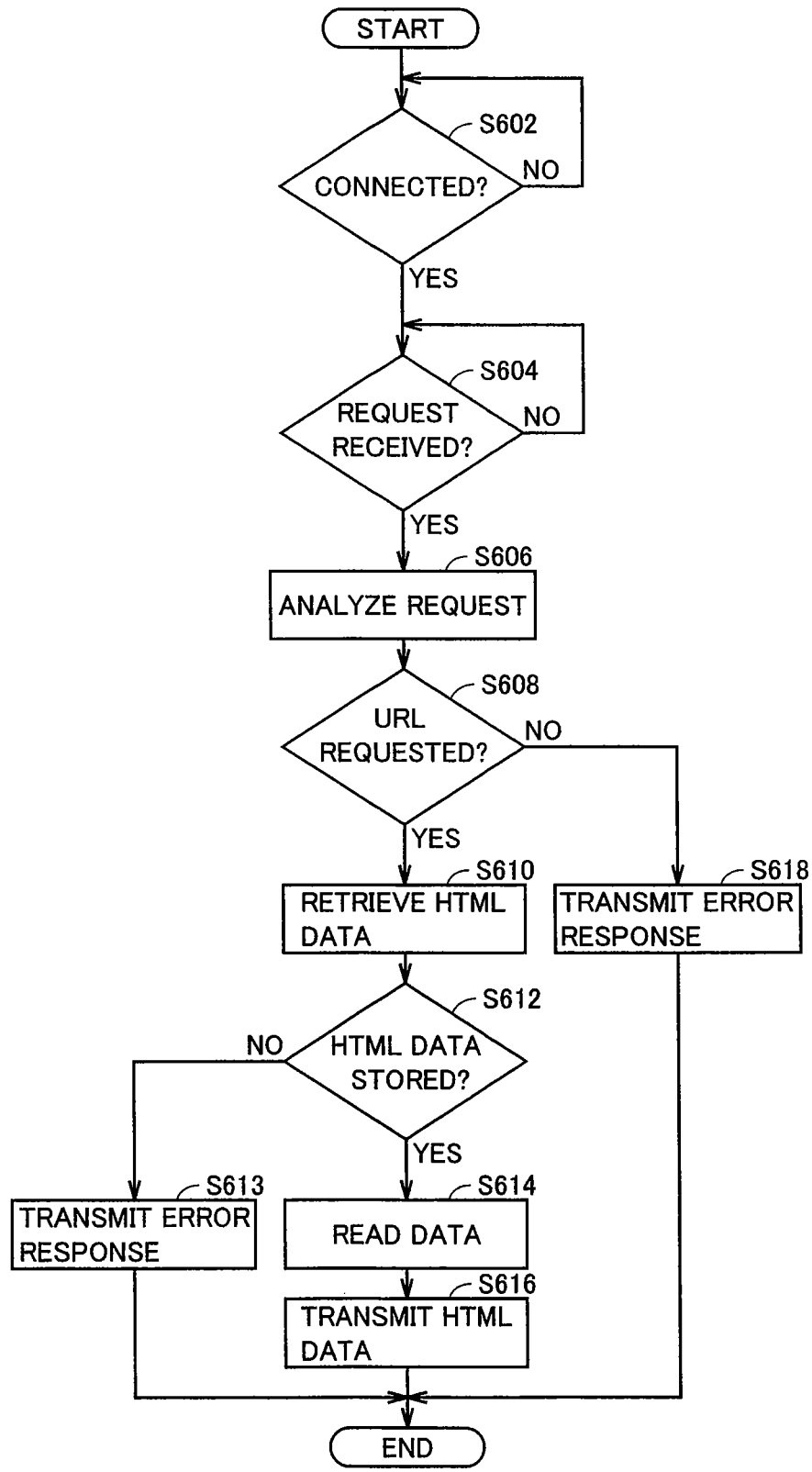
FIG. 18 shows a flowchart of a procedure of an HTML data transmitting process in the first server according to the second embodiment.

Next, description will be given of an HTML data transmitting process in server SRV1. FIG. 18 shows a flowchart of a procedure of the HTML data transmitting process in server SRV1. As shown in FIG. 18, first, CPU 200 awaits a connection request from image processing apparatus MFP (step S602). When CPU 200 receives the connection request from image processing apparatus MFP (YES in step S602), then, CPU 200 determines whether to receive a certain request message from image processing apparatus MFP (step S604). When CPU 200 receives a request message from image processing apparatus MFP (YES in step S604), then, CPU 200 analyzes the request message (step S606).

If the request message from image processing apparatus MFP is a transmission request of first HTML data (YES in step S608), CPU 200 access HDD 210 to retrieve first HTML data based on an address and a file name each contained in the request message (step S610). If the relevant first HTML data is stored in HDD 210 (YES in step S612), CPU 200 reads the first HTML data from HDD 210 (step S614) and transmits the first HTML data to image processing apparatus MFP through network I/F unit 206 (step S616). If the relevant first HTML data is not stored in HID 210 (NO in step S612), CPU 200 sends an error message to image processing apparatus MFP through network I/F unit 206 (step S613).

On the other hand, if the request message from image processing apparatus MFP is not a transmission request of first HTML data (NO in step S608), CPU 200 sends an error message to image processing apparatus MFP through network I/F unit 206 (step S618).

<Image Data Storing Process in Server SRV2>

Figure 19:
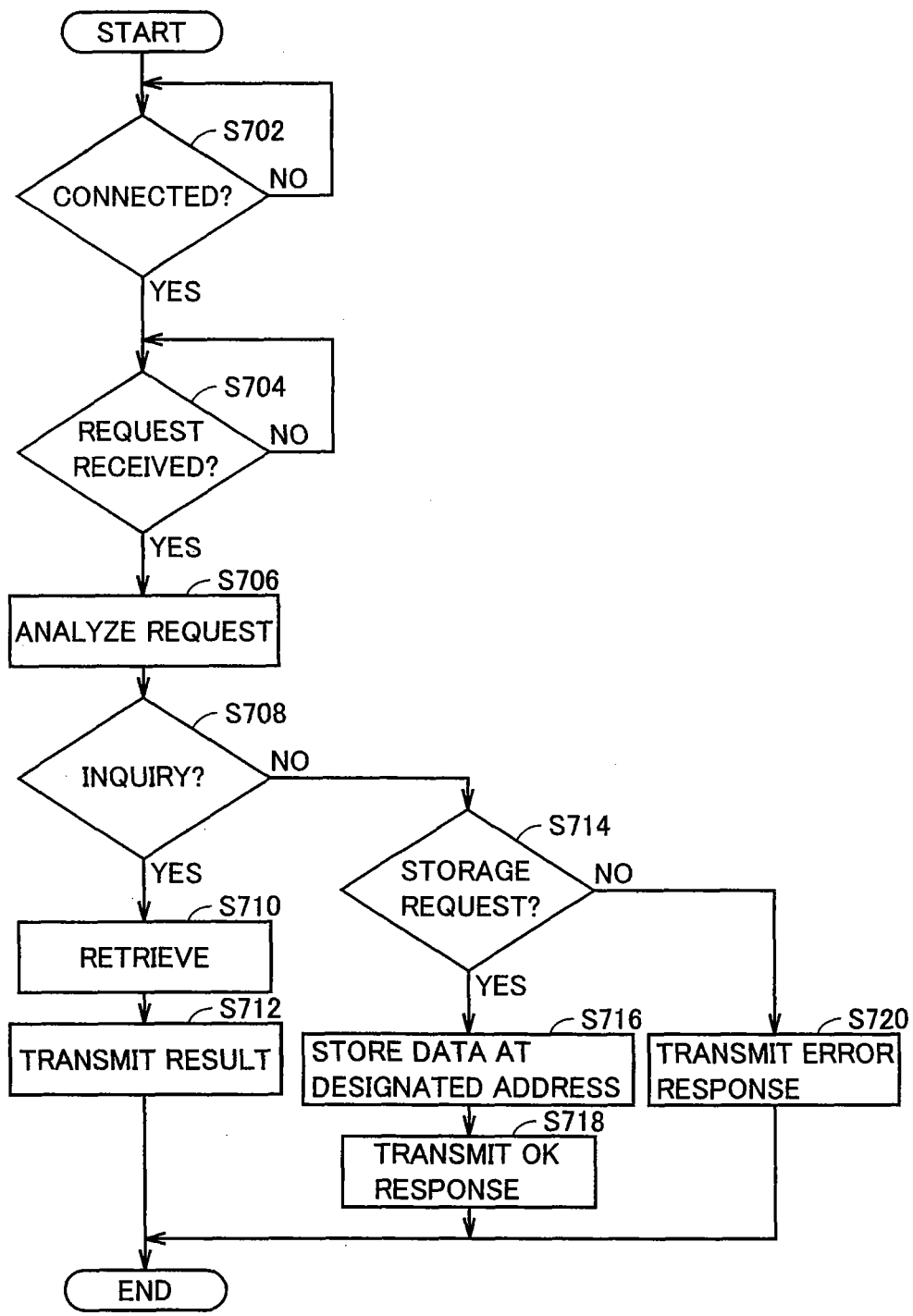
FIG. 19 shows a flowchart of a procedure of an image data storing process in the second server according to the second embodiment.

Next, description will be given of an image data storing process in server SRV2. FIG. 19 shows a flowchart of a procedure of the image data storing process in server SRV2. As shown in FIG. 19, first, CPU 200 awaits a connection request from image processing apparatus MFP (step S702). When CPU 200 receives the connection request from image processing apparatus MFP (YES in step S702), then, CPU 200 determines whether to receive a certain request message from image processing apparatus MFP (step S704). When CPU 200 receives a request message from image processing apparatus MFP (YES in step S704), then, CPU 200 analyzes the request message (step S706).

Next, CPU 200 determines whether the request message from image processing apparatus MFP is an inquiry for examining existence/nonexistence of image data (step S708). If the request message from image processing apparatus MFP is an inquiry for examining existence/nonexistence of image data (YES in step S708), CPU 200 determines, based on an address and a file name each contained in the request message from image processing apparatus MFP, whether data having the file name is stored at the address (step S710). Next, CPU 200 transmits a result of the determination to image processing apparatus MFP through network I/F unit 206 (step S712).

On the other hand, if the request message from image processing apparatus MFP is not an inquiry for examining existence/nonexistence of image data (NO in step S708), CPU 200 determines whether the request message from image processing apparatus MFP is a storage request of image data (step S714). If the request message from image processing apparatus MFP is a storage request of image data (YES in step S714), CPU 200 stores image data at a designated address contained in the storage request (step S716) and transmits information about completion of the storing process to image processing apparatus MFP (step S718). If the request message from image processing apparatus MFP is not a storage request of image data (NO in step S714), CPU 200 sends an error message to image processing apparatus MFP through network I/F unit 206 (step S720).

Third Embodiment

Next, description will be given of a third embodiment of the present invention. According to the first embodiment, network system 1 has the configuration that image processing apparatus MFP sends a request message of first HTML data and an inquiry message of the first HTML data independently of each other and server SRV determines existence/nonexistence of image data based on the inquiry message. According to the third embodiment, on the other hand, a network system 1c has a configuration that an image processing apparatus MFP sends a normal request message to a server SRV for every link information. Moreover, image processing apparatus MFP determines existence/nonexistence of image data, based on a response of server SRV to the normal request message. That is, according to the third embodiment, network system 1c has a configuration that normal server SRV can change first HTML data based on existence/nonexistence of image data.

A general configuration of network system 1c according to the third embodiment is similar to that of network system 1 according to the first embodiment; therefore, description thereof will not be given here repeatedly. Moreover, hardware configurations of image processing apparatus MFP and server SRV according to the third embodiment are similar to those of image processing apparatus MFP and server SRV according to the first embodiment, respectively; therefore, description thereof will not be given here repeatedly. In the following, mainly, description will be given of functions of and process procedures in image processing apparatus MFP as well as functions of and process procedures in server SRV according to the third embodiment.

<Operation Outline of Network System 1c>

Figure 20:
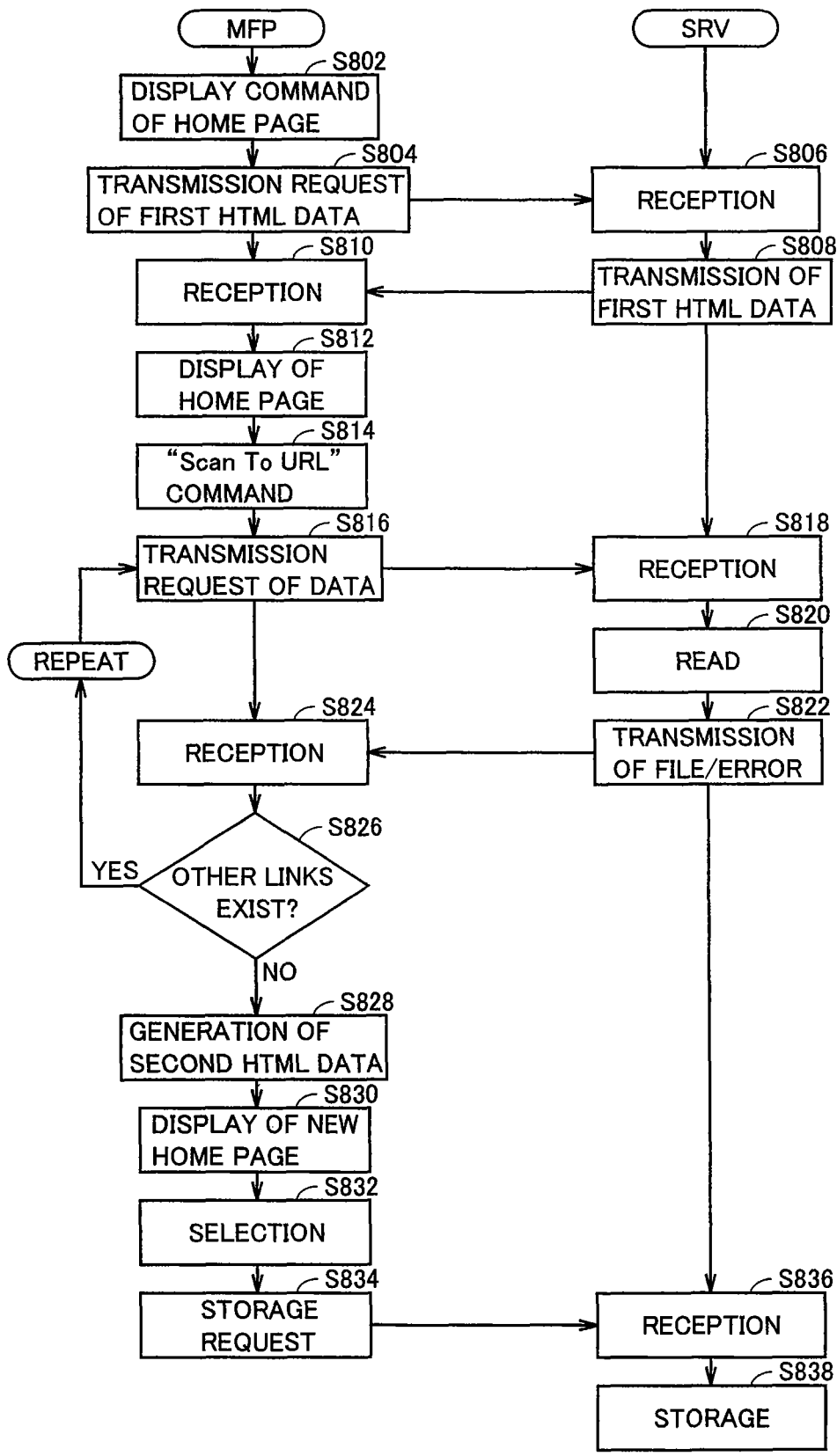
FIG. 20 shows a sequence diagram of an operation outline of a network system according to a third embodiment of the present invention.

First, description will be given of an operation outline of network system 1c according to the third embodiment. FIG. 20 shows a sequence diagram of the operation outline of network system 1c according to the third embodiment. The operation outline of network system 1c according to the third embodiment (FIG. 20) is different from that of network system 1 according to the first embodiment (FIG. 2). Specifically, steps S816 to S828 shown in FIG. 20 are different from steps S016 to S028 shown in FIG. 2.

As shown in FIG. 20, when image processing apparatus MFP receives a command to display a home page (step S802), then, image processing apparatus MFP issues a transmission request of first HTML data for displaying a home page to server SRV (step S804). Server SRV receives the request (step S806) and transmits the relevant first HTML data to image processing apparatus MFP (step S808).

Image processing apparatus MFP receives the first HTML data (step S810) and displays the home page based on the first HTML data (step S812). Next, image processing apparatus MFP accepts an inquiry command to display an inquiry about whether data is stored at a link of the displayed home page (step S814). Upon acceptance of the inquiry command, image processing apparatus MFP issues a transmission request of data about first link information in the first HTML data to server SRV (step S816). That is, image processing apparatus MFP sends a request message of image data to server SRV as in the case of the first HTML data.

Server SRV receives the request message of the image data (step S818) and reads data contained in the request message (step S820). As in the case of the first HTML data, next, server SRV transmits the image data to image processing apparatus MFP (step S822). If the relevant image data is not stored in server SRV, server SRV sends an error message to image processing apparatus MFP as in the case of the first HTML data (step S822).

Image processing apparatus MFP receives the image data (step S824) and determines whether the first HTML data to be displayed currently has link information which does not undergo the request of image data yet (step S826). If the first HTML data to be displayed has link information which does not undergo the request of image data yet (YES in step S826), image processing apparatus MFP repeats the processes in step S816 and the subsequent steps.

On the other hand, when all pieces of link information in the first HTML data to be displayed undergo the inquiry request of image data (NO in step S826), image processing apparatus MFP generates new HTML data (second H data) based on the first HTML data and the image data from server SRV (step S828). In the second HTML data, a link in which data exists in an address of link information and a link in which no data exists in an address of link information are set in different display formats. Next, image processing apparatus MFP displays a home page which is changed in display format, based on the second HTML data (step S830).

Next, image processing apparatus MFP accepts a selection command to select a link from a user (step S832). Next, image processing apparatus MFP scans an image, adds a file name contained in corresponding link information to image data, and transmits the image data to an address contained in the link information (step S834). Server SRV receives the image data (step S836) and stores the image data at the address (step S838).

Next, detailed description will be given of configurations for realizing the functions described above.

<Functional Configuration of Network System 1c>

Figure 21:
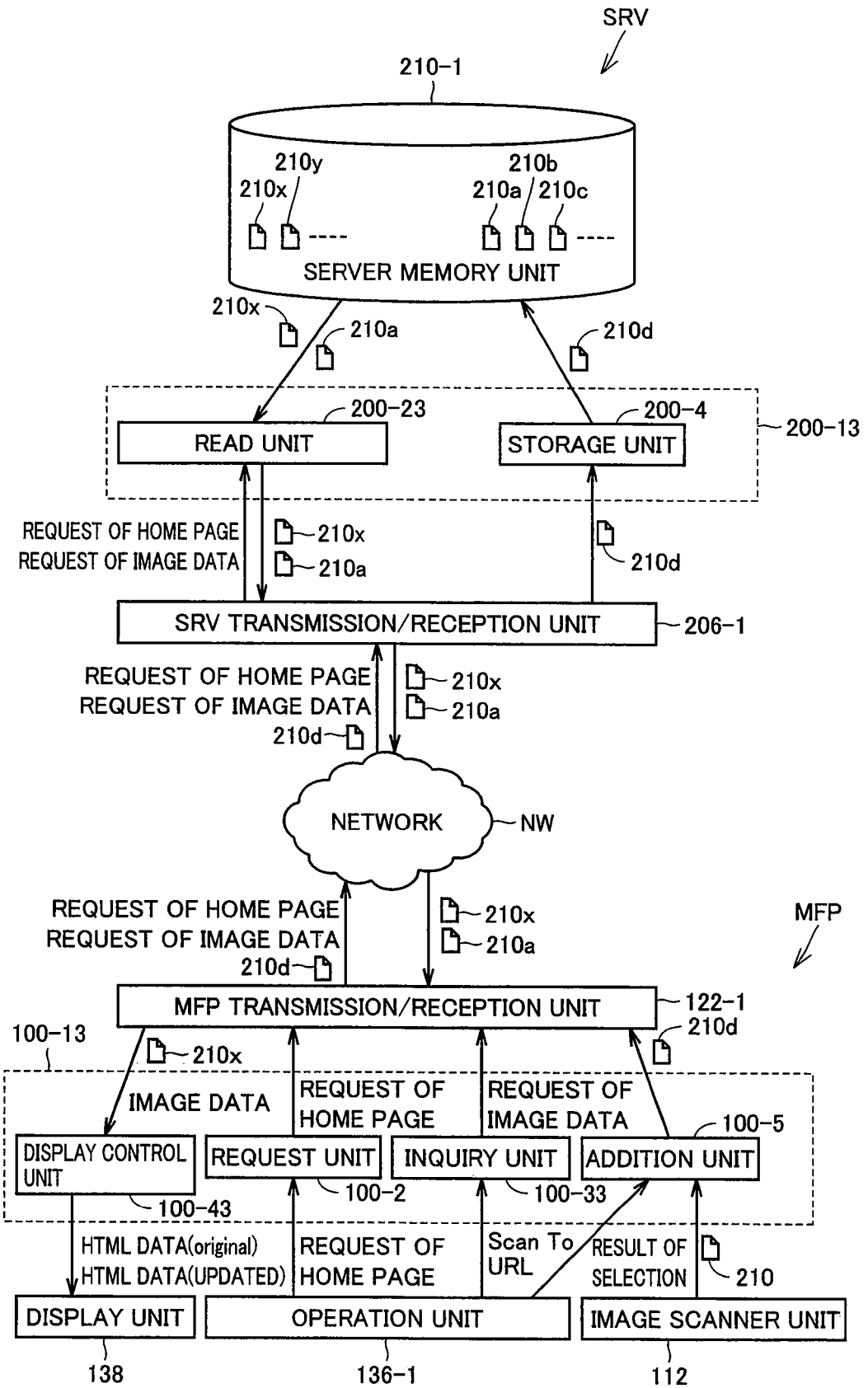
FIG. 21 shows a block diagram of functional configurations of an image processing apparatus and a server according to the third embodiment.

Next, description will be given of functional configurations of image processing apparatus MFP and server SRV according to the third embodiment. FIG. 21 shows a block diagram of the functional configurations of image processing apparatus MFP and server SRV according to the third embodiment.

(Functional Configuration of Server SRV)

With reference to FIG. 21, server SRV includes an SRV transmission/reception unit 206-1, a memory unit 210-1 and an SRV control unit 200-13.

SRV transmission/reception unit 206-1 and memory unit 210-1 are similar to those described in the first embodiment; therefore, description thereof will not be given here repeatedly. SRV control unit 200-13 has functions of a read unit 200-23, a storage unit 200-4 and the like.

Read unit 200-23 accepts a transmission request of first HTML data and image data through SRV transmission/reception unit 206-1, reads first HTML data and image data, for example, the first HTML data and image data 210a shown in FIG. 6 from memory unit 210-1, and makes SRV transmission/reception unit 206-1 to transmit the first HTML data and image data 210a to image processing apparatus MFP.

Storage unit 200-4 receives image data from image processing apparatus MFP through SRV transmission/reception unit 206-1, and stores the image data in memory unit 210-1. Specifically, storage unit 200-4 stores image data 210d having a file name added thereto at an address of a link selected by image processing apparatus MFP.

(Functional Configuration of Image Processing Apparatus MFP)

On the other hand, image processing apparatus MFP includes a display unit 138, an operation unit 136-1, an image scanner unit 112, an MFP transmission/reception unit 122-1 and an MFP control unit 100-13.

Display unit 138, operation unit 136-1, image scanner unit 112 and MFP transmission/reception unit 122-1 are similar to those described in the first embodiment; therefore, description thereof will not be given here repeatedly. MFP control unit 100-13 has functions of a request unit (first acquisition unit) 100-2, an inquiry unit 100-33, a display control unit 100-43, an addition unit 100-5 and the like. Request unit 100-2 and addition unit 100-5 are similar to those described in the first embodiment; therefore, description thereof will not be given here repeatedly.

Inquiry unit 100-33 accepts a command to determine whether data is stored in a link of a home page (second command) through operation unit 136-1. Based on the second command, inquiry unit 100-33 sends a message about a transmission request of image data which has a file name contained in link information and is stored at an address contained in the link information to server SRV through MFP transmission/reception unit 122-1 for every link information contained in first HTML data in descending order of position in the first HTML data.

Display control unit 100-43 makes display unit 138 to display a home page (first page) based on first HTML data. Moreover, display control unit 100-43 obtains second HTML data indicating a new home page (second page) and makes display unit 138 to display the new home page based on the second HTML data. In the second page, a link in which image data having a corresponding file name is stored at a corresponding storage position and a link in which image data having a corresponding file name is not stored at a corresponding storage position are displayed in different display formats. More specifically, display control unit 100-4 generates the second HTML data based on the first HTML data and the image data (or an error message) received from server SRV through MFP transmission/reception unit 122-1, and makes display unit 138 to display the second page based on the second HTML data.

More specifically, display control unit 100-43 receives image data, which has a file name contained in link information and is stored at an address contained in the link information, from server SRV for every link information contained in first HTML data. Next, display control unit 100-43 changes the first HTML data based on a fact whether the image data is received normally, that is, a fact whether an error message is received. Thus, display control unit 100-43 generates second HTML data. In the second HTML data, a display format of a link in which image data having a file name contained in link information is not stored at an address contained in the link information is different from a display format of a link in which image data having a file name contained in link information is stored at an address contained in the link information.

As described above, request unit 100-2, inquiry unit 100-33 and display control unit 100-43 realize an acquisition unit that obtains first HTML data and image data or an error message from server SRV through MFP transmission/reception unit 122-1 to generate second HTML data. More specifically, request unit 100-2 realizes a first acquisition unit that issues a transmission request of first HTML data to server SRV through MFP transmission/reception unit 122-1 and obtains the first HTML data from server SRV through MFP transmission/reception unit 122-1. On the other hand, inquiry unit 100-33 and display control unit 100-43 realize a second acquisition unit that issues a transmission request of image data to server SRV through MFP transmission/reception unit 122-1, receives the image data or an error message from server SRV through MFP transmission/reception unit 122-1, and generates second HTML data.

<Home Page Displaying Process, Inquiring Process and Image Data Transmitting Process in Image Processing Apparatus MFP>

Herein, procedures of a home page displaying process and an image data transmitting process in image processing apparatus MFP are similar to those described in the first embodiment (see FIGS. 11 and 13); therefore, description thereof will not be given here repeatedly. In the following, description will be given of an inquiring process (corresponding to step S200 shown in FIG. 11) in image processing apparatus MFP.

Figure 22:
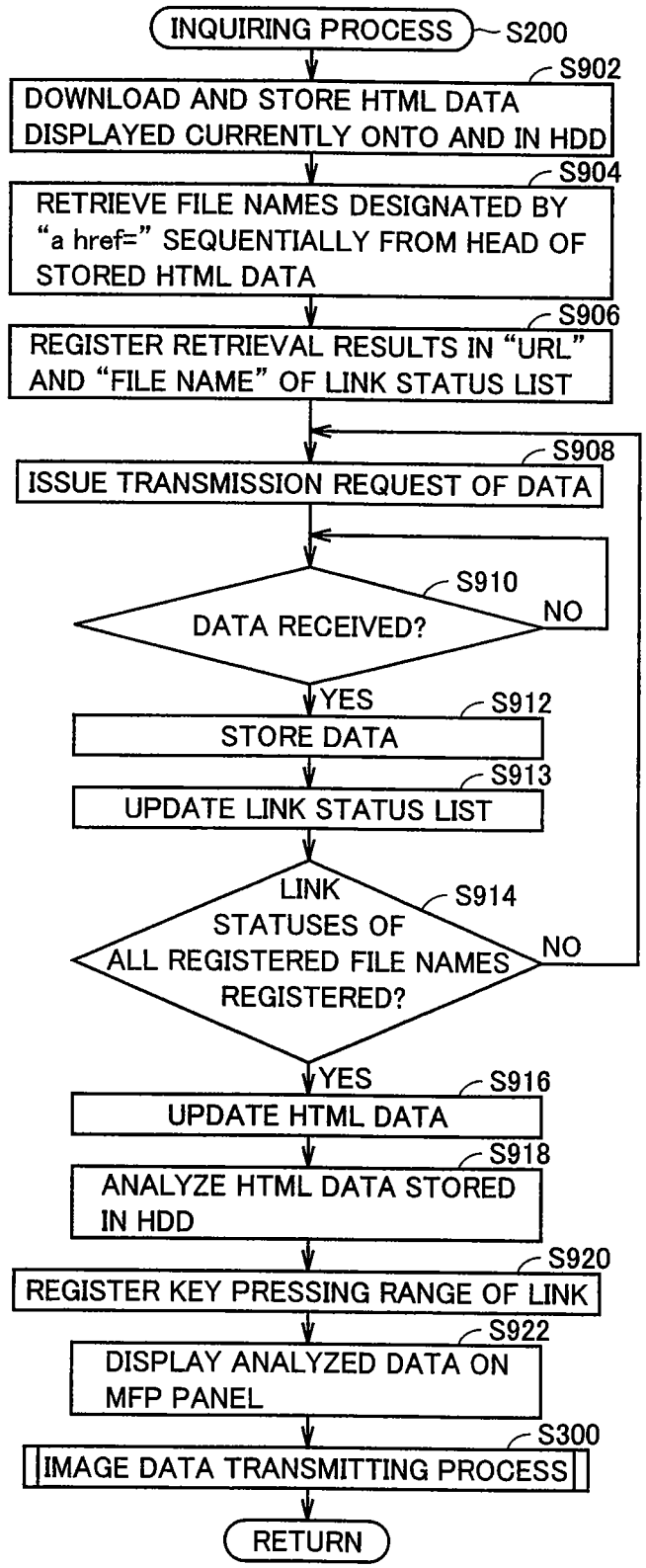
FIG. 22 shows a flowchart of a procedure of an inquiring process in the image processing apparatus according to the third embodiment.

FIG. 22 shows a flowchart of a procedure of the inquiring process (step S200) in image processing apparatus MFP. The inquiring process in image processing apparatus MFP according to the third embodiment (FIG. 22) is different from the inquiring process in image processing apparatus MFP according to the first embodiment (FIG. 12). Specifically, steps S908 to S913 shown in FIG. 22 are different from steps S208 to S212 shown in FIG. 12.

As shown in FIG. 22, a CPU 100 stores in an HDD 110 first HTML data displayed on display unit 138 (step S902). Next, CPU 100 retrieves link information contained in the first HTML data (step S904). More specifically, CPU 100 extracts file names each designated by "a href=" sequentially from a head of the first HTML data. Next, CPU 100 registers results of the retrieval in a link status list 104-1 (step S906). That is, CPU 100 registers the plural pieces of link information designated by "a href=" in link status list 104-1.

Next, CPU 100 issues a transmission request of data of a link to server SRV through a network I/F unit 122 for every link information registered in link status list 104-1 (step S908). When CPU 100 receives image data from server SRV (YES in step S910), then, CPU 100 stores the image data in HDD 110 (step S912). Concurrently, CPU 100 stores in link status list 104-1 information about a fact that the image data exists in the link (step S913).

On the other hand, when CPU 100 receives an error message from server SRV (YES in step S910), then, CPU 100 stores the error message in HDD 110 (step S912). Concurrently, CPU 100 stores in link status list 104-1 information about a fact that no data exists in the link (step S913).

Next, CPU 100 determines whether link statuses of all pieces of link information registered in link status list 104-1 are stored (step S914). If the link statuses of all the file names registered in link status list 104-1 are not stored yet (NO in step S914), CPU 100 repeats the processes in step S208 and the subsequent steps.

On the other hand, if the link statuses of all pieces of link information registered in link status list 104-1 are stored (YES in step S914), CPU 100 generates new HTML data (second HTML data) based on link status list 104-1 and the first HTML data (step S916). Next, CPU 100 analyzes the second HTML data (step S918). Herein, CPU 100 registers a key pressing range in link status list 104-1 for every link in the second HTML data (step S920). Next, CPU 100 makes display unit 138 to display a new home page (second page) based on the second HTML data (step S922). Thereafter, CPU 100 performs the image data transmitting process (step S300).

<Image Data Storing Process in Server SRV>

Figure 23:
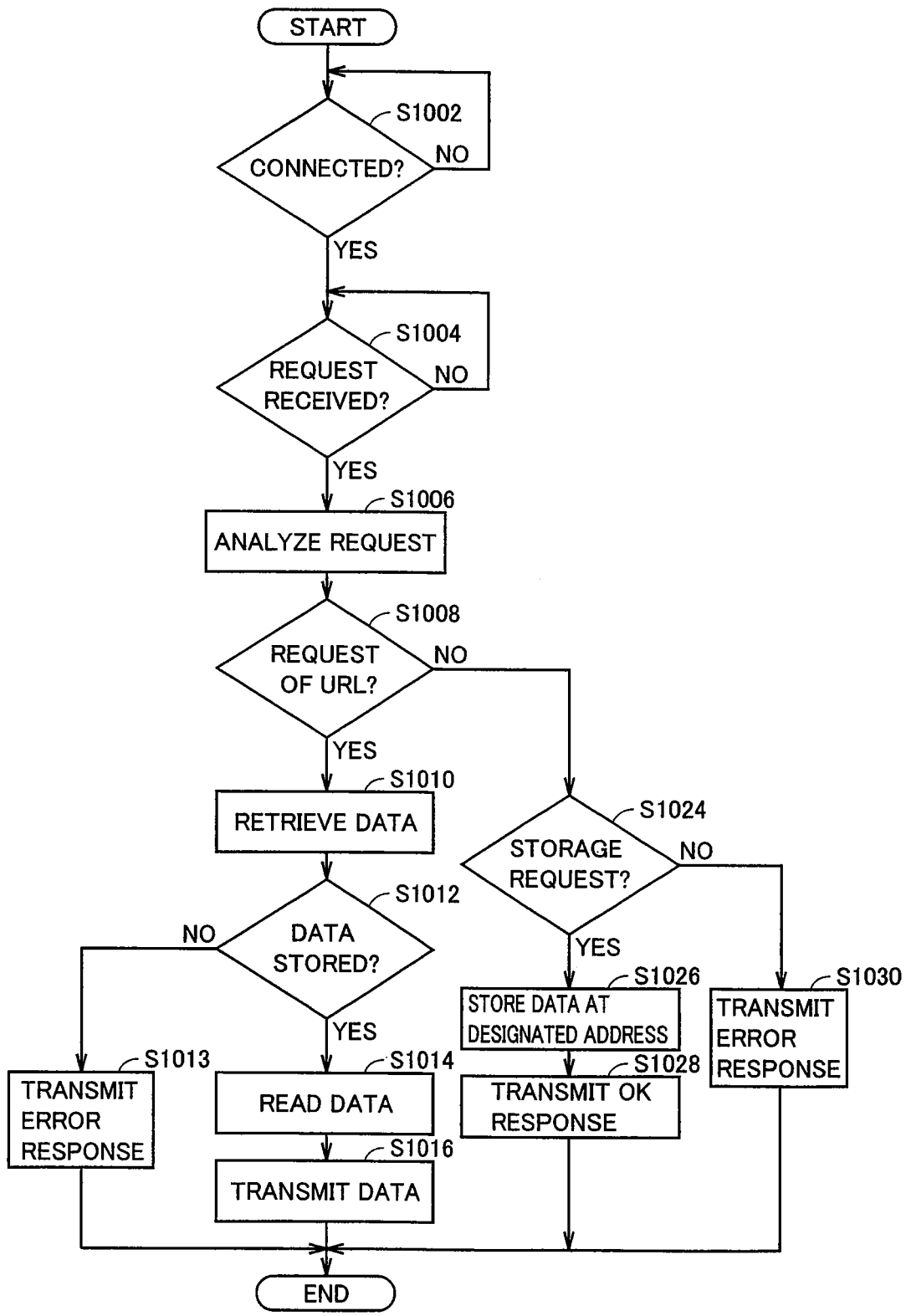
FIG. 23 shows a flowchart of a procedure of an image data storing process in the server according to the third embodiment.

Next, description will be given of an image data storing process in server SRV. FIG. 23 shows a flowchart of a procedure of the image data storing process in server SRV. As shown in FIG. 23, a CPU 200 awaits a connection request from image processing apparatus MFP (step S1002). When CPU 200 receives the connection request from image processing apparatus MFP (YES in step S1002), then, CPU 200 determines whether to receive a certain request message from image processing apparatus MFP (step S1004). When CPU 200 receives a request message from image processing apparatus MFP (YES in step S1004), then, CPU 200 analyzes the request message (step S1006).

If the request message from image processing apparatus MFP is a transmission request of first HTML data (YES in step S1008), CPU 200 accesses an HDD 210 to retrieve first HTML data based on an address and a file name each contained in the request message (step S1010). If the relevant first HTML data is stored in HDD 210 (YES in step S1012), CPU 200 reads the first HTML data from HDD 210 (step S1014), and transmits the first HTML data to image processing apparatus MFP through a network I/F unit 206 (step S1016). If the relevant first HTML data is not stored in HDD 210 (NO in step S1012), CPU 200 transmits an error message to image processing apparatus MFP through network I/F unit 206 (step S1013).

On the other hand, if the request message from image processing apparatus MFP is not a transmission request of first HTML data (NO in step S1008), CPU 200 determines whether the request message from image processing apparatus MFP is a storage request of image data (step S1024). If the request message from image processing apparatus MFP is a storage request of image data (YES in step S1024), CPU 200 stores the relevant image data at a designated address contained in the storage request (step S1026), and transmits information about completion of the storing process to image processing apparatus MFP (step S1028). If the request message from image processing apparatus MFP is not a storage request of image data (NO in step S1024), CPU 200 sends an error message to image processing apparatus MFP through network I/F unit 206 (step S1030).

Fourth Embodiment

Next, description will be given of a fourth embodiment of the present invention. According to the first embodiment, network system 1 has the configuration that image processing apparatus MFP generates new HTML data (second HTML data) based on an inquiry result. According to the fourth embodiment, on the other hand, a network system 1*d* has a configuration that a server SRV generates second HTML data.

A general configuration of network system 1*d* according to the fourth embodiment is similar to that of network system 1 according to the first embodiment; therefore, description thereof will not be given here repeatedly. In addition, hardware configurations of an image processing apparatus MFP and server SRV according to the fourth embodiment are similar to those of image processing apparatus MFP and server SRV according to the first embodiment, respectively; therefore, description thereof will not be given here repeatedly. In the following, mainly, description will be given of functions of and process procedures in image processing apparatus MFP as well as functions of and process procedures in server SRV according to the fourth embodiment.

<Operation Outline of Network System 1*d*>

Figure 24:
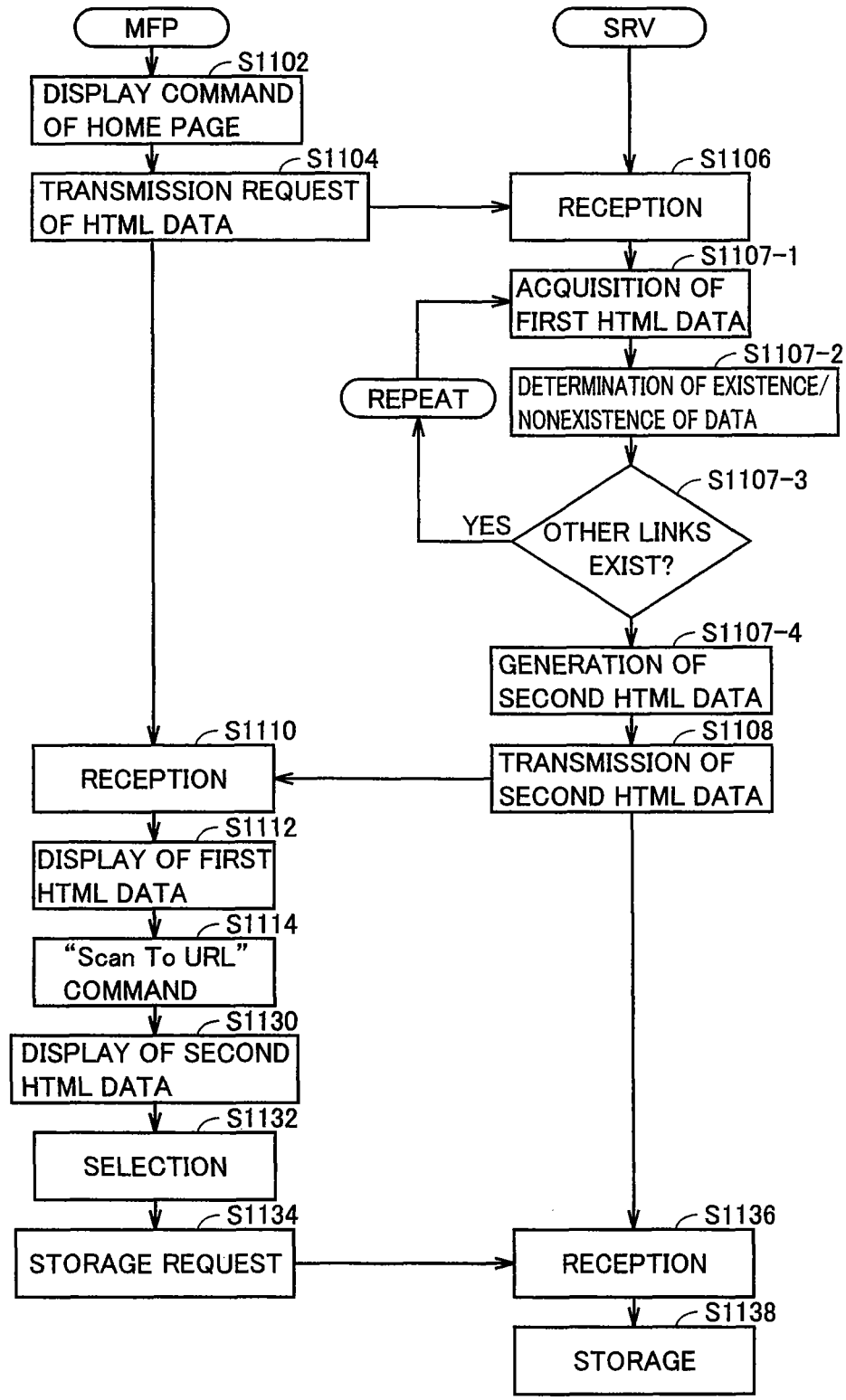
FIG. 24 shows a sequence diagram of an operation outline of a network system according to a fourth embodiment of the present invention.

First, description will be given of an operation outline of network system 1*d* according to the fourth embodiment. FIG. 24 shows a sequence diagram of the operation outline of network system 1*d* according to the fourth embodiment. The operation outline of network system 1*d* according to the fourth embodiment (FIG. 24) is different from that of network system 1 according to the first embodiment (FIG. 2). Specifically, steps S1106 to S1108 and S1114 to S1130 shown in FIG. 24 are different from steps S006 to S008 and S014 to S030 shown in FIG. 2.

As shown in FIG. 24, when image processing apparatus MFP accepts a command to display a home page (step S1102), then, image processing apparatus MFP issues a transmission request of first HTML data for displaying a home page to server SRV (step S1104). Server SRV receives the request (step S1106) and reads the relevant first HTML data (step S1107-1). Next, server SRV determines whether data is stored at a link with regard to first link information contained in the first HTML data (step S1107-2).

If the determination is made to all pieces of link information in the first HTML data (NO in step S1107-3), server SRV generates new HTML data (second HTML data) based on the first HTML data and results of the determination (step S1107-4). In the second HTML data, a link in which data exists in an address contained in link information and a link in which no data exists in an address contained in link information are set in different display formats. Next, server SRV transmits the first HTML data and the second HTML data to image processing apparatus MFP (step S1108).

Image processing apparatus MFP receives the first HTML data and the second HTML data (step S1110) and displays the home page based on the first HTML data (step S1112). Next, image processing apparatus MFP accepts a command to display an inquiry about whether data is stored at a link of the displayed home page (step S1114). Upon reception of the inquiry command, image processing apparatus MFP displays a home page, which is changed in display format, based on the second HTML data (step S1130).

Next, image processing apparatus MFP accepts a selection command to select a link from a user (step S1132). Next, image processing apparatus MFP scans an image, adds a file name contained in corresponding link information to image data, and transmits the image data to an address contained in the link information (step S1134). Server SRV receives the image data (step S1136) and stores the image data at the address (step S1138).

Next, detailed description will be given of configurations for realizing the functions described above.

<Functional Configuration of Network System 1*d*>

Figure 25:
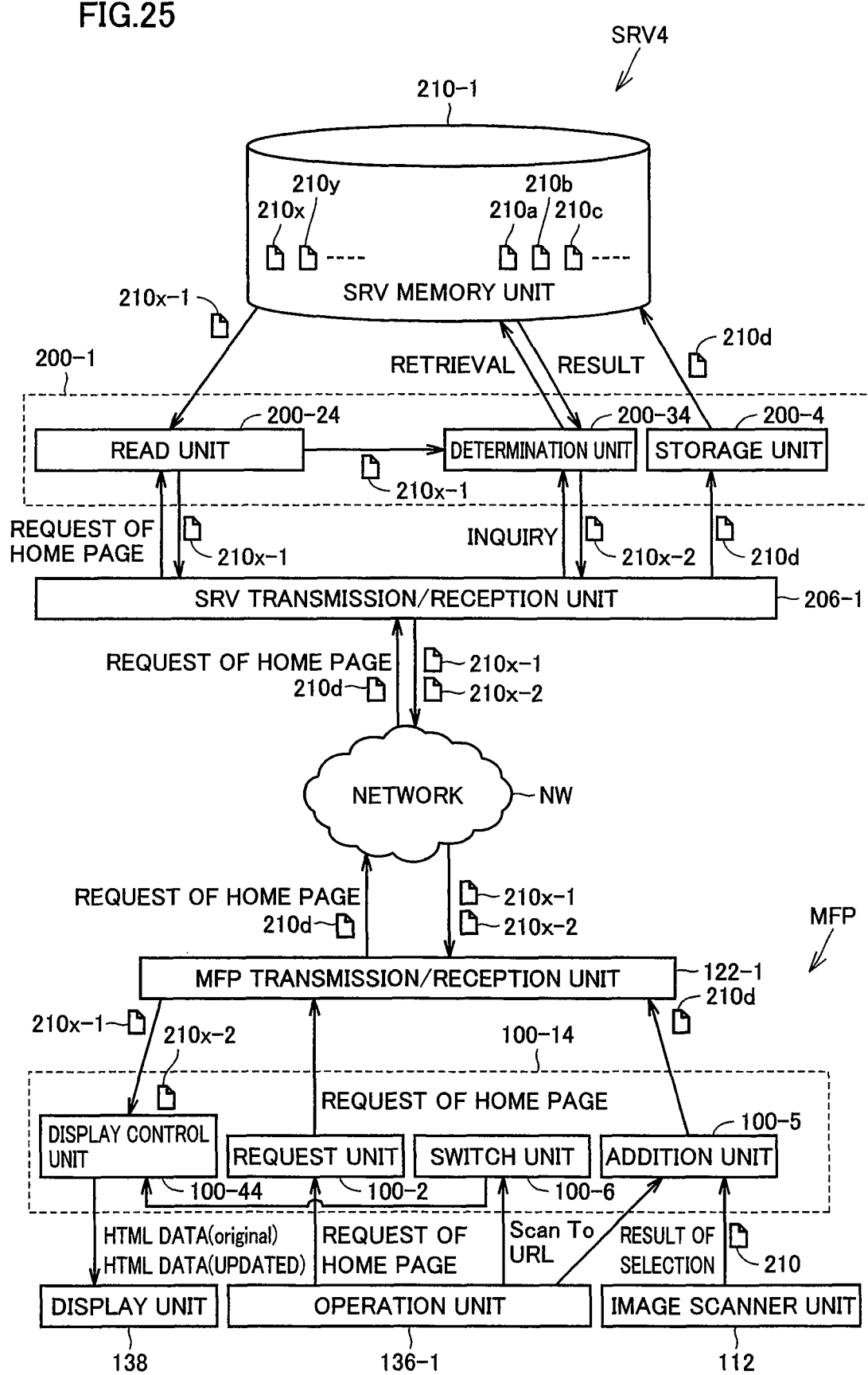
FIG. 25 shows a block diagram of functional configurations of an image processing apparatus and a server according to the fourth embodiment.

Next, description will be given of functional configurations of image processing apparatus MFP and server SRV according to the fourth embodiment. FIG. 25 shows a block diagram of the functional configurations of image processing apparatus MFP and server SRV according to the fourth embodiment.

(Functional Configuration of Server SRV)

With reference to FIG. 25, server SRV includes an SRV transmission/reception unit 206-1, a memory unit 210-1 and an SRV control unit 200-14.

SRV transmission/reception unit 206-1 and memory unit 210-1 are similar to those described in the first embodiment; therefore, description thereof will not be given here repeatedly. SRV control unit 200-14 has functions of a read unit 200-24, a determination unit 200-34, a storage unit 200-4 and the like.

Read unit 200-24 accepts a transmission request of first HTML data through SRV transmission/reception unit 206-1. Read unit 200-24 reads first HTML data, for example, the first HTML data shown in FIG. 6 from memory unit 210-1, and makes SRV transmission/reception unit 206-1 to transmit the first HTML data to image processing apparatus MFP.

Determination unit 200-34 accesses memory unit 210-1 to determine whether data having a file name contained in link information is stored at a storage position contained in the link information, for every link information contained in the first HTML data. Next, determination unit 200-34 generates new HTML data (second HTML data) based on the first HTML data and results of the determination. That is, determination unit 200-34 realizes a generation unit that generates second HTML data. Determination unit 200-34 makes SRV transmission/reception unit 206-1 to transmit the second HTML data to image processing apparatus MFP.

Storage unit 200-4 receives image data 210*d* from image processing apparatus MFP through SRV transmission/reception unit 206-1, and stores image data 210*d* in memory unit 210-1. Specifically, storage unit 200-4 stores image data 210*d* having a file name added thereto at an address of a link selected by image processing apparatus MFP.

(Functional Configuration of Image Processing Apparatus MFP)

On the other hand, image processing apparatus MFP includes a display unit 138, an operation unit 136-1, an image scanner unit 112, an MFP transmission/reception unit 122-1 and an MFP control unit 100-1.

Display unit 138, operation unit 136-1, image scanner unit 112 and MFP transmission/reception unit 122-1 are similar to those described in the first embodiment; therefore, description thereof will not be given here repeatedly. MFP control unit 100-13 has functions of a request unit (first acquisition unit) 100-2, a display control unit 100-44, an addition unit 100-5, a switch unit 100-6 and the like. Request unit 100-2 and addition unit 100-5 are similar to those described in the first embodiment; therefore, description thereof will not be given here repeatedly.

Display control unit 100-44 makes display unit 138 to display a home page (first page) based on first HTML data. Moreover, display control unit 100-44 obtains second HTML data for displaying a new home page (second page) and makes display unit 138 to display the new home page based on the second HTML data. In the second page, a link in which image data having a corresponding file name exists in a corresponding storage position and a link in which image data having a corresponding file name does not exist in a corresponding storage position are displayed in different display formats.

Specifically, switch unit 100-6 accepts a display command of the second page from the user through operation unit 136-1. Next, switch unit 100-6 inputs a switch command to display control unit 100-44. In accordance with the switch command, display control unit 100-44 makes display unit 138 to display the second page based on the second HTML data. In other words, display control unit 100-44 selectively displays one of the first HTML data and the second HTML data each received from server SRV, in accordance with the switch command inputted through operation unit 136-1.

As described above, request unit 100-2 and display control unit 100-44 realize an acquisition unit that obtains first HTML data and second HTML data from server SRV through MFP transmission/reception unit 122-1. More specifically, request unit 100-2 realizes a first acquisition unit that issues a transmission request of first HTML data to server SRV through MFP transmission/reception unit 122-1 and obtains the first HTML data from server SRV. On the other hand, display control unit 100-44 realizes a second acquisition unit that obtains second HTML data from server SRV through MFP transmission/reception unit 122-1.

<Home Page Displaying Process in Image Processing Apparatus MFP>

Figure 26:
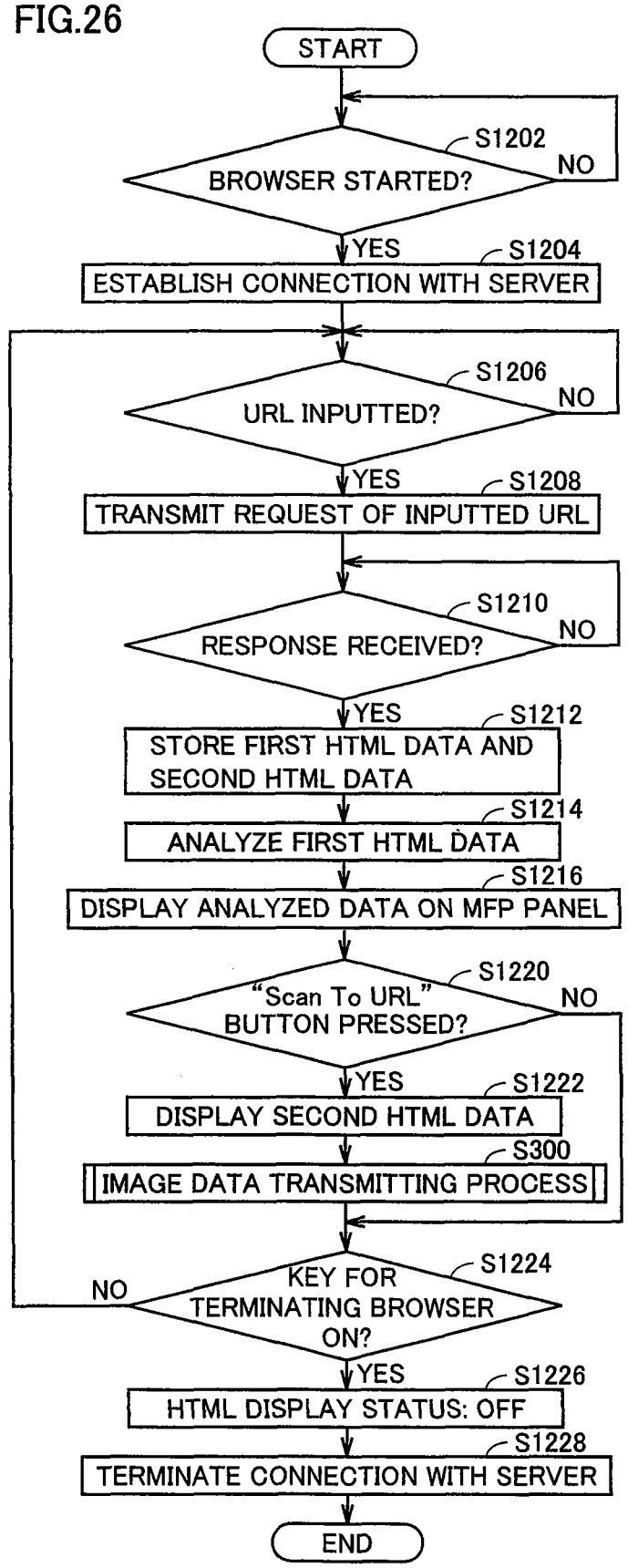
FIG. 26 shows a flowchart of a procedure of a home page displaying process in the image processing apparatus according to the fourth embodiment.

Next, description will be given of a home page displaying process in image processing apparatus MFP. FIG. 26 shows a flowchart of a procedure of the home page displaying process in image processing apparatus MFP. As shown in FIG. 26, for example, when the user enters a command to start up a web browser through an operation panel 114 (YES in step S1202), that is, when the user presses a web browser button 114-1 on operation panel 114 (see FIG. 7), a CPU 100 establishes connection with server SRV through a network I/F unit 122 (step S1204). When the user enters a URL through a touch panel 136 or when the user selects desired one of URLs stored in advance (YES in step S1206), CPU 100 issues a transmission request of first HTML data in the inputted URL to server SRV through network I/F unit 122 (step S1208).

When CPU 100 receives the first HTML data and the second HTML data from server SRV through network I/F unit 122 (YES in step S1210), then, CPU 100 stores the first HTML data and the second HTML data in an HDD 110 or an S-RAM 104 (step S1212). Next, CPU 100 analyzes the first HTML data (step S1214) and makes display unit 138 to display a home page (step S1216). In this state, when the user presses a "Scan To URL" button 114-2 on operation panel 114 (see FIG. 7) (YES in step S1220), CPU 100 analyzes the second HTML data and displays an updated home page (step S1222). Next, CPU 100 performs an image data transmitting process (step S300). The image data transmitting process (step S300) in the fourth embodiment is similar to that described in the first embodiment; therefore, description thereof will not be given here repeatedly.

Thereafter, when the user enters a command to terminate the web browser function (YES in step S1224), CPU 100 terminates display of the home page based on the first or second HTML data (step S1226). For example, when the user presses a copy button 114-3 (see FIG. 7), CPU 100 terminates the display of the home page (step S1226). Next, CPU 100 terminates the connection with server SRV (step S1228).

On the other hand, if the user does not enter the command to terminate the web browser function (NO in step S1224), CPU 100 repeats the processes in step S1206 and the subsequent steps.

<Image Data Storing Process in Server SRV>

Figure 27:
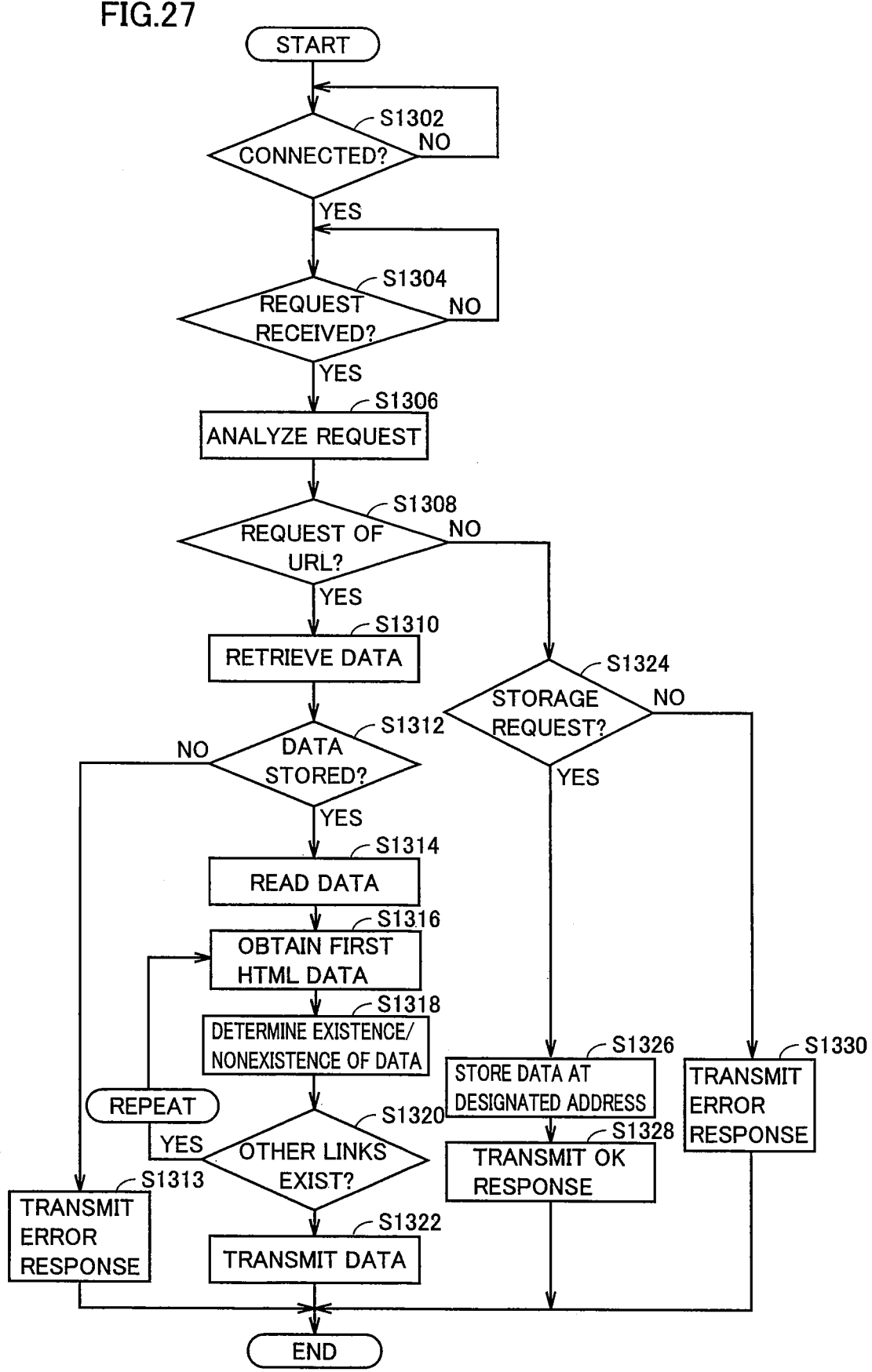
FIG. 27 shows a flowchart of a procedure of an image data storing process in the server according to the fourth embodiment.

Next, description will be given of an image data storing process in server SRV. FIG. 27 shows a flowchart of a procedure of the image data storing process in server SRV according to the fourth embodiment. As shown in FIG. 27, a CPU 200 awaits a connection request from image processing apparatus MFP (step S1302). When CPU 200 receives the connection request from image processing apparatus MFP (YES in step S1302), then, CPU 200 determines whether to receive a certain request message from image processing apparatus MFP (step S1304). When CPU 200 receives a request message from image processing apparatus MFP (YES in step S1304), then, CPU 200 analyzes the request message (step S1306).

If the request message from image processing apparatus MFP is a transmission request of first HTML data (YES in step S1308), CPU 200 accesses an HDD 210 to retrieve first HTML data based on an address and a file name each contained in the request message (step S1310). If the relevant first HTML data is stored in HDD 210 (YES in step S1312), CPU 200 reads the first HTML data from HDD 210 (step S1314).

Next, CPU 200 determines whether data is stored at a link with regard to first link information in the first HTML data (step S1316). When the foregoing determination is made to all pieces of link information in the first HTML data (NO in step S1318), CPU 200 generates new HTML data (second HTML data) based on the first HTML data and results of the determination (step S1320). In the second HTML data, a link in which data exists in an address contained in link information and a link in which no data exists in an address contained in link information are set in different display formats. CPU 200 transmits the first HTML data and the second HTML data to image processing apparatus MFP through network I/F unit 206 (step S1322).

On the other hand, if the relevant first HTML data is not stored in HDD 210 (NO in step S1312), CPU 200 transmits an error message to image processing apparatus MFP through network I/F unit 206 (step S1313).

On the other hand, if the request message from image processing apparatus MFP is not a transmission request of first HTML data (NO in step S1308), CPU 200 determines whether the request message from image processing apparatus MFP is a storage request of image data (step S1324). If the request message from image processing apparatus MFP is a storage request of image data (YES in step S1324), CPU 200 stores image data at a designated address contained in the storage request (step S1326) and transmits information about completion of the storing process to image processing apparatus MFP (step S1328). If the request message from image processing apparatus MFP is not a storage request of image data (NO in step S1324), CPU 200 sends an error message to image processing apparatus MFP through network I/F unit 206 (step S1330).

Modification of Fourth Embodiment

Herein, network system 1d according to the fourth embodiment may have the following configuration. For example, server SRV receives an HTML data update request from image processing apparatus MFP for every link information contained in first HTML data and updates the first HTML data based on the HTML data update request. FIG. 28 shows a sequence diagram of an operation outline of network system 1d according to a modification of the fourth embodiment.

As shown in FIG. 28, when image processing apparatus MFP accepts a command to display a home page (step S1402), then, image processing apparatus MFP issues a transmission request of first HTML data for displaying a home page to server SRV (step S1404). Server SRV receives the request (step S1406) and transmits the relevant first HTML data to image processing apparatus MFP (step S1408).

Next, image processing apparatus MFP receives the first HTML data (step S1410) and displays a home page based on the first HTML data (step S1412). Next, image processing apparatus MFP accepts an inquiry command to display an inquiry about whether data is stored at a link of the displayed home page (step S1414). Upon acceptance of the inquiry command, image processing apparatus MFP issues an HTML data update request to server SRV with regard to first link information in the first HTML data (step S1416). In other words, image processing apparatus MFP transmits an HTML data update message containing an address and a file name to server SRV.

Server SRV receives an HTML data update message (step S1418) and determines whether data having the file name contained in the HTML data update message is stored at the address contained in the HTML data update message (step S1420). Next, server SRV generates new HTML data (second HTML data) based on the first HTML data and a result of the determination (step S1421). In the second HTML data, a link in which data exists in an address contained in link information and a link in which no data exists in an address contained in link information are set in different display formats. Next, server SRV transmits the second HTML data to image processing apparatus MFP (step S1422).

Image processing apparatus MFP receives the second HTML data (step S1424) and displays the second HTML data (step S1425). Next, image processing apparatus MFP determines whether the second HTML data to be displayed currently has link information which does not undergo the process based on the HTML data update request yet (step S1426). If the second HTML data to be displayed has link information of which link is not determined yet (YES in step S1426), the image processing apparatus MFP repeats the processes in step S1416 and the subsequent steps.

On the other hand, if all pieces of link information in the second HTML data to be displayed undergo the process based on the HTML data update request (NO in step S1426), image processing apparatus MFP accepts a selection command to select a link from the user (step S1432). Image processing apparatus MFP scans an image, adds a file name contained in corresponding link information to image data, and transmits the image data to an address contained in the link information (step S1434). Server SRV receives the image data (step S1436) and stores the image data at the address (step S1438).

Other Embodiments

A program according to the present invention may be implemented as follows. That is, a process is performed in such a manner that required program modules of program modules provided as a part of an operating system (OS) of a computer are called in a predetermined arrangement at a predetermined timing. In this case, the program itself does not contain the module described above, and the process is performed in cooperation with the OS. The program according to the present invention may cover the program containing no module.

Alternatively, the program according to the present invention may be provided while being incorporated in a part of another program. Also in this case, the program itself contains no module which is contained in another program described above, and a process is performed in cooperation with another program described above. The program according to the present invention may also cover the program incorporated in another program.

A program product to be provided is executed while being installed in a program storage unit such as a hard disk. Herein, the program product includes the program itself and a medium that stores the program.

Further, functions realized by the program according to the present invention may be partially or entirely configured with dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A network system, comprising:
an image processing apparatus; and
at least one server configured to exchange data with said image processing apparatus over a network; wherein
said at least one server stores first data containing plural pieces of link information, each link information correlates a file name of image data to a storage position of the image data;
said image processing apparatus includes
a display,
an obtaining unit obtaining second data containing information for identifying said link information having no image data in a corresponding storage position among said plural pieces of link information contained in said first data,
a display control unit making said display selectively display first link information having image data in a corresponding storage position and second link information having no image data in the corresponding storage position in different formats, based on said second data,
a scanning unit scanning an image to generate image data, and
a transmission unit transmitting, in accordance with a selection command from a user for selecting a piece among the displayed second link information, the generated image data to the corresponding storage position; and said at least one server includes a storage unit receiving said image data from said image processing apparatus and storing said image data in the corresponding storage position.

2. The network system according to claim 1, wherein
said at least one server includes a first server,
said first server includes a response unit responding to an inquiry about existence or nonexistence of image data designated externally, and
said obtaining unit includes
a first obtaining unit obtaining said first data from said first server, in accordance with a first user request, and
a second obtaining unit sequentially making the inquiry about existence or nonexistence of each image data specified by said link information contained in the obtained first data to said first server to generate said second data, in accordance with a second user request.

3. The network system according to claim 1, wherein
said at least one server includes a first server that stores said first data and a second server that stores said image data,
said second server includes a response unit responding to an inquiry about existence or nonexistence of image data designated externally, and
said obtaining unit includes
a first obtaining unit obtaining said first data from said first server, in accordance with a first user request, and
a second obtaining unit sequentially making the inquiry about existence or nonexistence of each image data specified by said link information contained in the obtained first data to said second server to generate said second data, in accordance with a second user request.

4. The network system according to claim 1, wherein
said at least one server includes a generating unit determining whether each image data specified by said link information contained in said first data exists or not, to generate said second data, and
said obtaining unit obtains said first data and said second data from said server, in accordance with a first user request.

5. The network system according to claim 1, wherein
said at least one server includes a generating unit determining whether each image data specified by said link information contained in said first data exist or not, to generate said second data, and
said obtaining unit includes
a first obtaining unit obtaining said first data from said server, in accordance with a first user request, and
a second obtaining unit obtaining said second data from said server, in accordance with a second user request.

6. The network system according to claim 1, wherein
said transmission unit adding the file name corresponding to said selection command to said image data and transmitting said image data to the corresponding storage position.

7. An image processing apparatus capable of exchanging data with at least one server over a network, comprising:
a display;
an obtaining unit obtaining from said at least one server first data containing plural pieces of link information, each link information correlates a file name of image data to a storage position of the image data, and obtaining second data containing information for identifying said link information having no image data in a corresponding storage position among said plural pieces of link information contained in said first data;
a display control unit making said display selectively display first link information having image data in a corresponding storage position and second link information having no image data in the corresponding storage position in different formats, based on said second data;
a scanning unit scanning an image to generate image data; and
a transmission unit transmitting, in accordance with a selection command from a user for selecting a piece among the displayed second link information, the generated image data to the corresponding storage position.

8. The image processing apparatus according to claim 7, wherein
said obtaining unit includes
a first obtaining unit obtaining said first data from said server, in accordance with a first user request, and
a second obtaining unit sequentially making an inquiry about existence or nonexistence of each image data specified by said link information contained in the obtained first data to said server to generate said second data, in accordance with a second user request.

9. The image processing apparatus according to claim 7, further comprising:
a request unit requesting image data to said server based on each link information contained in said first data, in accordance with a second user request, wherein
said obtaining unit includes
a first obtaining unit obtaining said first data from said server, in accordance with a first user request, and
a second obtaining unit generating said second data based on said first data and a response to the request of image data received from said server, in accordance with said second user request.

10. The image processing apparatus according to claim 7, wherein
said transmission unit adds the file name corresponding to said selection command to said image data and transmits said image data to the corresponding storage position.

11. An image data storing method in a network system including at least one server, comprising the steps of:
storing in said at least one server first data containing plural pieces of link information, each link information correlates a file name of image data to a storage position of the image data;
obtaining second data containing information for identifying
said link information having no image data in a corresponding storage position among said plural pieces of link information contained in said first data;
selectively displaying first link information having image data in a corresponding storage position and second link information having no image data in the corresponding storage position in different formats, based on said second data;
scanning an image to generate image data;
selecting a piece among the displayed second link information; and
storing the generated image data in the corresponding storage position in accordance with the selected piece.

12. The image data storing method according to claim 11, wherein
said at least one server includes a first server,
said image data storing method further comprising the steps of:
obtaining said first data from said first server, in accordance with a first user request;

making an inquiry about existence or nonexistence of each image data specified by said link information contained in the obtained first data to said first server, in accordance with a second user request;

responding to the inquiry about existence or nonexistence of each image data; and generating said second data based on said first data and a response to said inquiry.

13. The image data storing method according to claim 11, wherein said at least one server include a first server that stores said first data and a second server that stores said image data, said image data storing method further comprising the steps of:

obtaining said first data from said first server, in accordance with a first user request;

sequentially making an inquiry about existence or nonexistence of each image data specified by said link information contained in the obtained first data to said second server, in accordance with a second user request;

responding to the inquiry about existence or nonexistence of each image data; and generating said second data based on said first data and a response to said inquiry.

14. The image data storing method according to claim 11, further comprising the steps of:

obtaining said first data from said server, in accordance with a first user request;

requesting image data to said server based on each link information contained in the obtained first data, in accordance with a second user request; and generating said second data based on said first data and a response to said request.

15. The image data storing method according to claim 11, further comprising the steps of:

determining whether each image data specified by said link information contained in said first data exist or not, to generate said second data; and obtaining said first data and said second data from said server, in accordance with a first user request.

16. The image data storing method according to claim 11, further comprising the steps of:

determining whether each image data specified by said link information contained in said first data exists or not, to generate said second data;

obtaining said first data from said server, in accordance with a first user request; and obtaining said second data from said server, in accordance with a second user request.

17. The image data storing method according to claim 11, further comprising the steps of:

adding the file name corresponding to said selection command to said image data; and transmitting said image data to the corresponding storage position.

18. A non-transitory computer readable medium storing an image data transmitting program for causing an image processing apparatus to transmit image data to a server over a network, wherein said server stores first data containing plural pieces of link information, each link information correlate a file name of image data to a storage position of the image data, said image processing apparatus includes
a display,
a scanning unit,
a transmission/reception unit exchanging data with said server over said network, and
a controller controlling operations of said image processing apparatus, and said image data transmitting program causing said controller to execute the steps of:

obtaining said first data from said server through said transmission/reception unit, in accordance with a first user request;

making an inquiry about existence or nonexistence of each image data specified by said link information contained in the obtained first data to said server through said transmission/reception unit, in accordance with a second user request;

generating second data containing information for identifying said link information having no image data in a corresponding storage position among said plural pieces of link information, based on said first data and a response to said inquiry;

making said display selectively display first link information having image data in a corresponding storage position and second link information having no image data in the corresponding storage position in different formats, based on said second data;

making said scanning unit scan an image to generate image data; and transmitting, in accordance with a selection command from a user for selecting a piece among the displayed second link information, the generated image data to the corresponding storage position through said transmission/reception unit.

* * * * *